Figure 3:
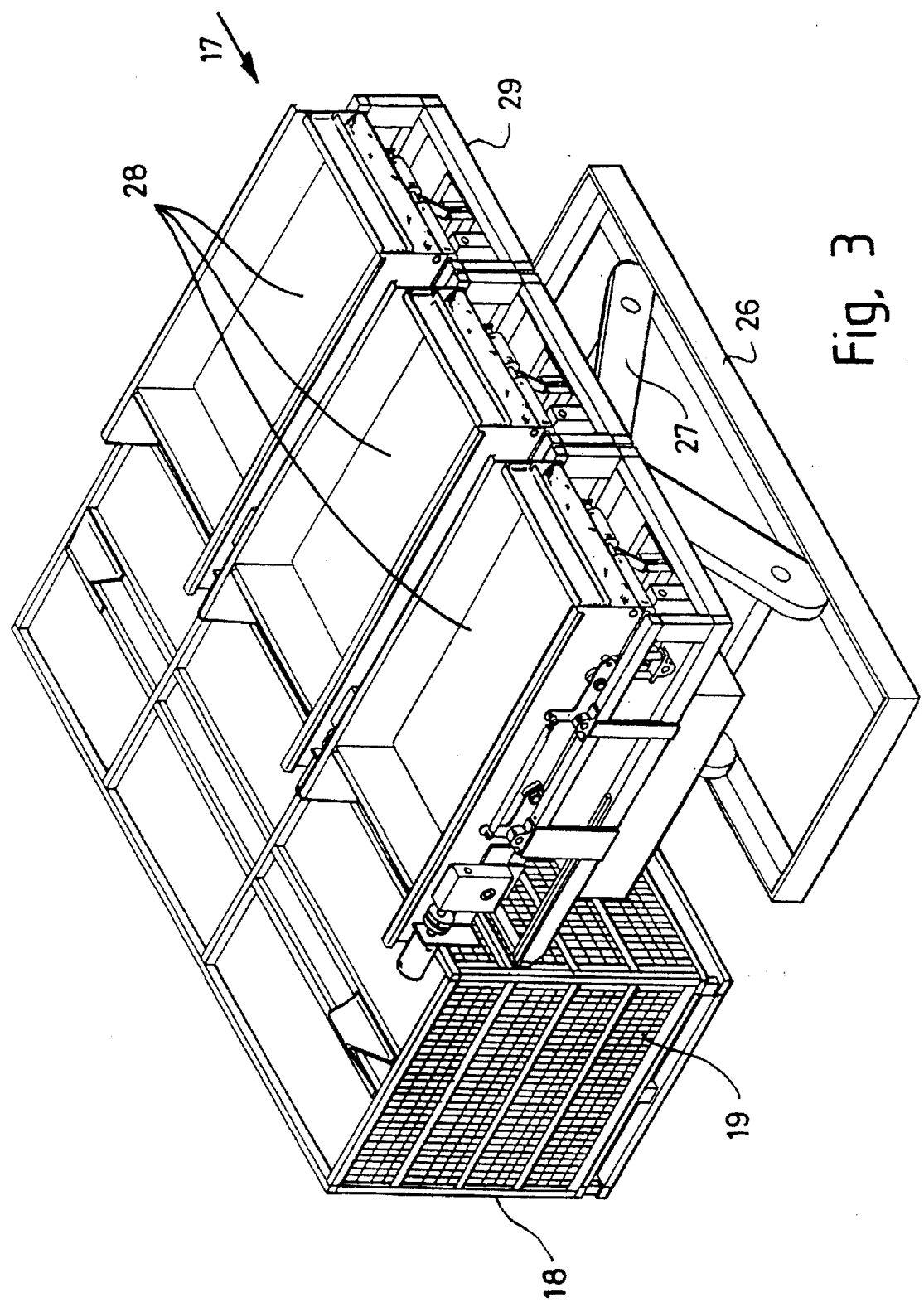

United States Patent [19]
Wills et al.

[11] Patent Number: 5,660,147
[45] Date of Patent: Aug. 26, 1997

[54] LIVESTOCK HANDLING APPARATUS AND METHOD

[75] Inventors: David Wills, Roydon; Geoffrey Francis Bateman, Willisham Tye, both of United Kingdom

[73] Assignee: Anglia Autoflow Limited, Norfolk, United Kingdom

[21] Appl. No.: 560,109

[22] Filed: Nov. 17, 1995

[30] Foreign Application Priority Data

Nov. 22, 1994 [GB] United Kingdom ............... 9423587
Apr. 25, 1995 [GB] United Kingdom ............... 9508336

[51] Int. Cl.⁶ ............................................. A01K 29/00
[52] U.S. Cl. ............................................. 119/846
[58] Field of Search ........................... 119/844, 845, 119/846

[56] References Cited

U.S. PATENT DOCUMENTS

| | | | |
|---|---|---|---|
| 3,110,388 | 11/1963 | Elliott et al. | 119/845 |
| 3,805,743 | 4/1974 | Crowder | 119/845 |
| 4,037,565 | 7/1977 | Ledwell, Jr. | 119/846 |
| 4,301,769 | 11/1981 | Mola | 119/844 |
| 4,365,591 | 12/1982 | Wills et al. | 119/845 |
| 4,567,852 | 2/1986 | Ledwell et al. | 119/846 |
| 4,600,351 | 7/1986 | Nelson | 119/846 |
| 4,736,710 | 4/1988 | Nicolai | 119/844 |
| 4,766,850 | 8/1988 | O'Neill | 119/846 |
| 5,101,767 | 4/1992 | Williams et al. | 1199/845 |

FOREIGN PATENT DOCUMENTS

WO 94/08451  4/1994  WIPO ............... 119/845

Primary Examiner—Robert P. Swiatek
Assistant Examiner—Yvonne R. Abbott
Attorney, Agent, or Firm—Lee, Mann, Smith, McWilliams, Sweeney & Ohlson

[57] ABSTRACT

Apparatus for loading live poultry into open-topped containers (19) comprise a plurality (preferably three) loading units (28) arranged side by side so that each loading unit (28) is aligned with a column of containers (19) accommodated in a standard module (18). Each loading unit has a batching receptacle (33) to receive a batch of poultry (of predetermined weight or number) corresponding to the capacity of one of the open-topped containers (19) which are in turn withdrawn from the module (18), loaded with a batch of poultry and then returned to the module, each loading unit (28) shifting vertically as successive containers are loaded with poultry. A separate catching vehicle (54) may be used to catch the poultry and deliver it to the apparatus.

24 Claims, 20 Drawing Sheets

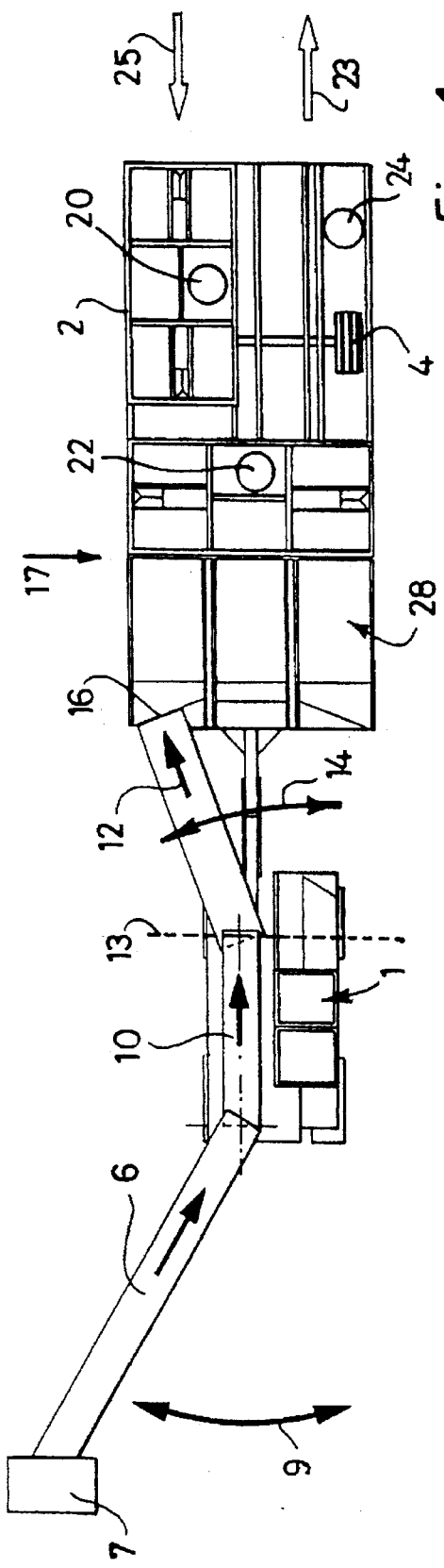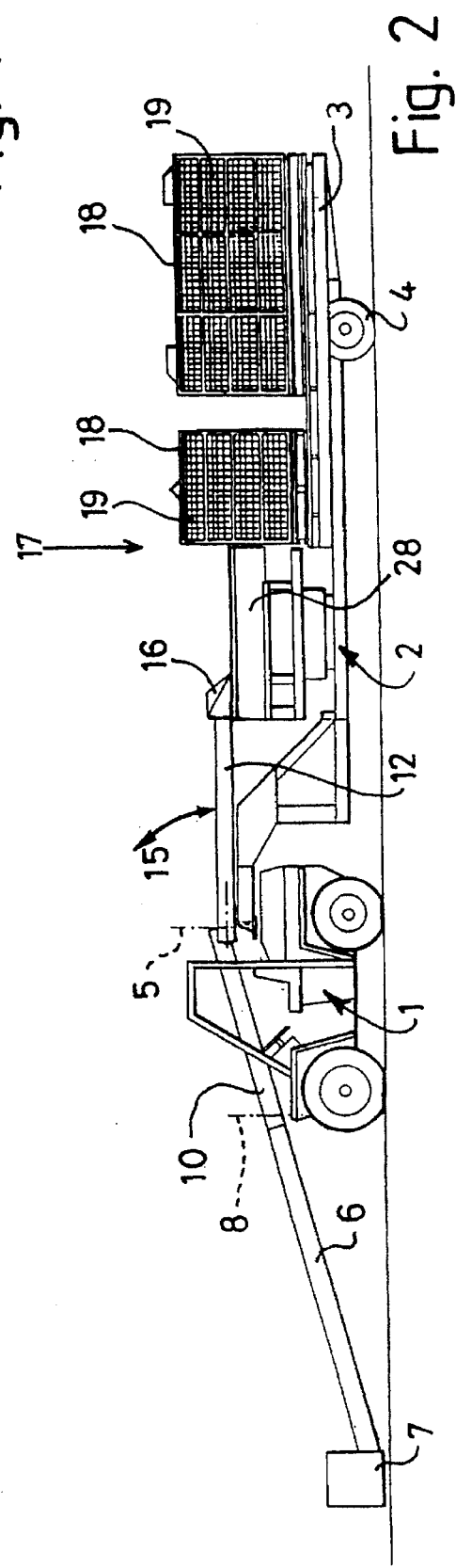

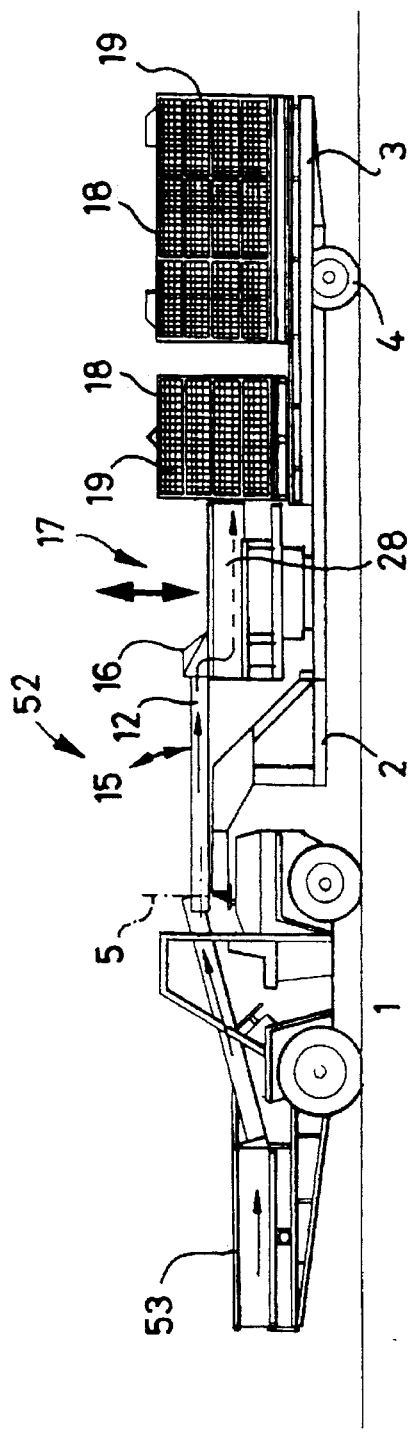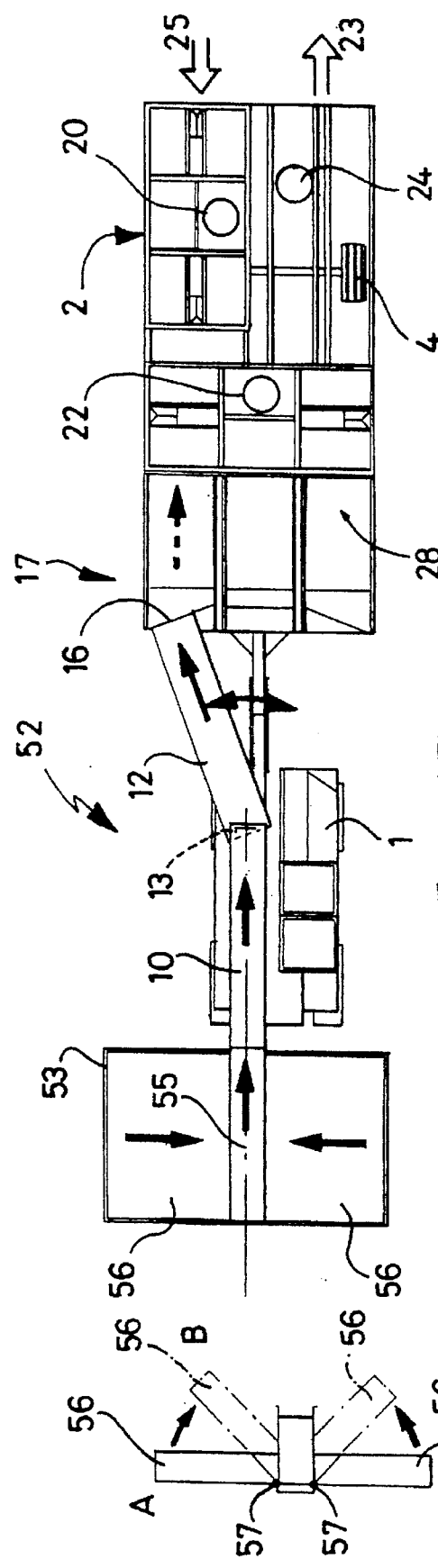

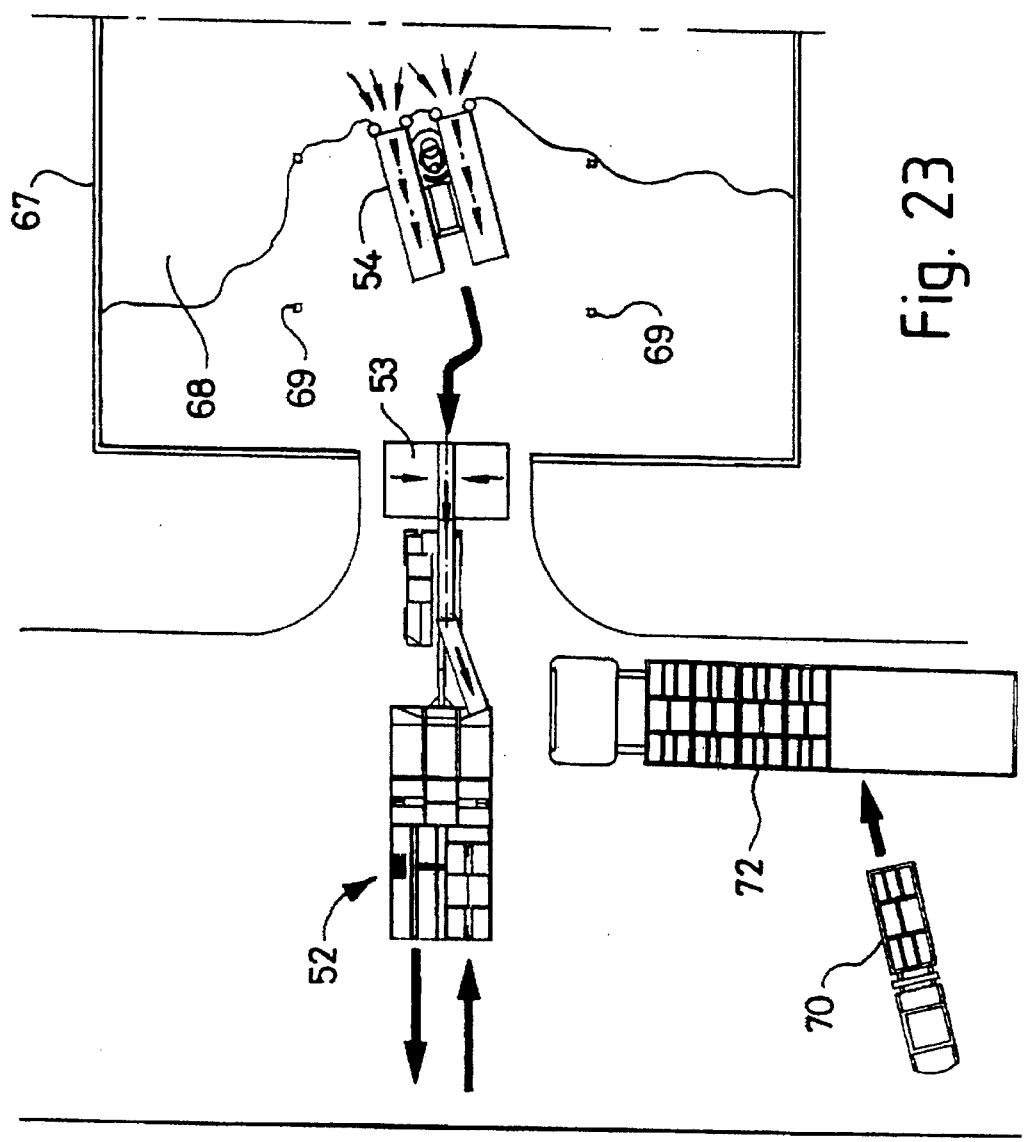

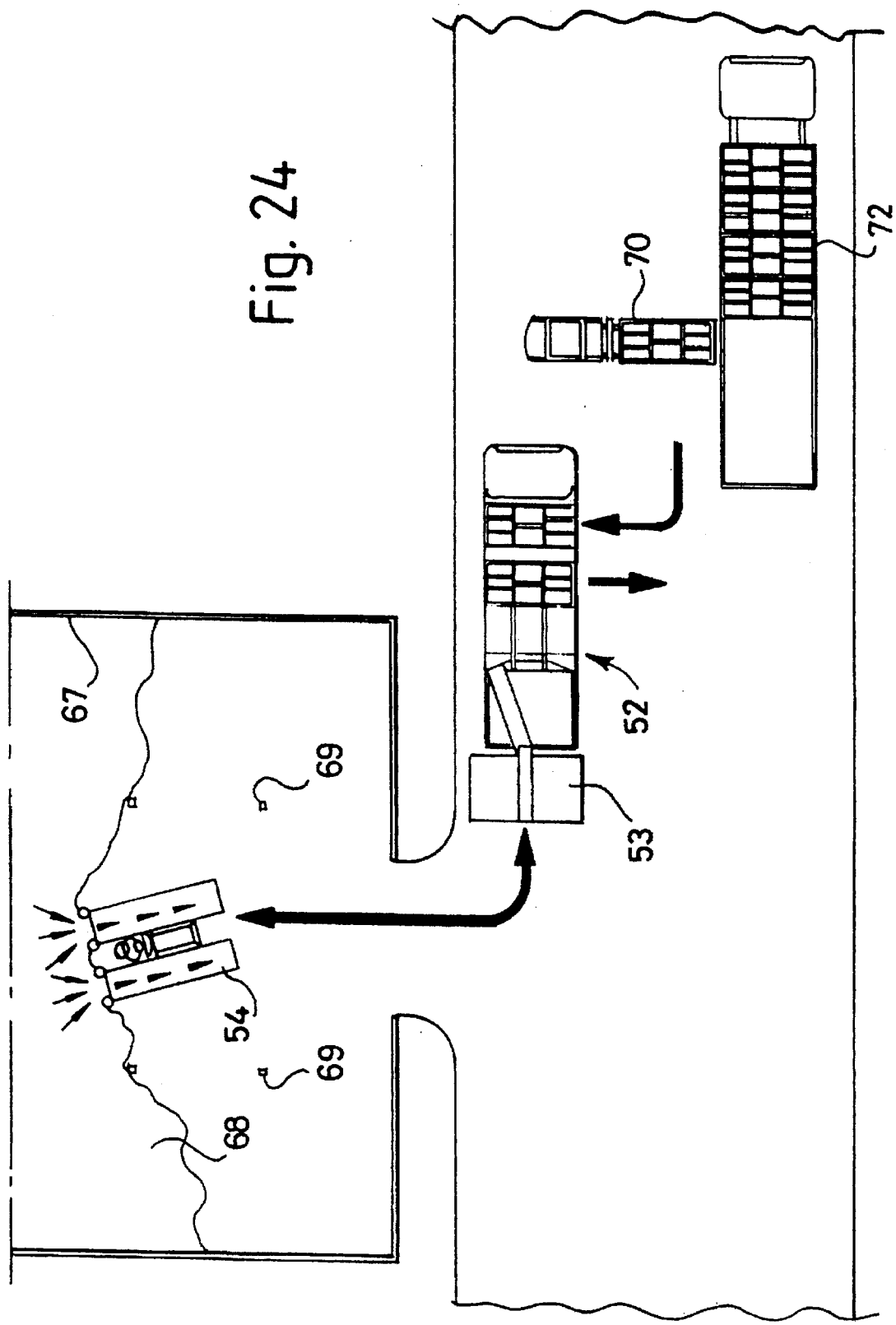

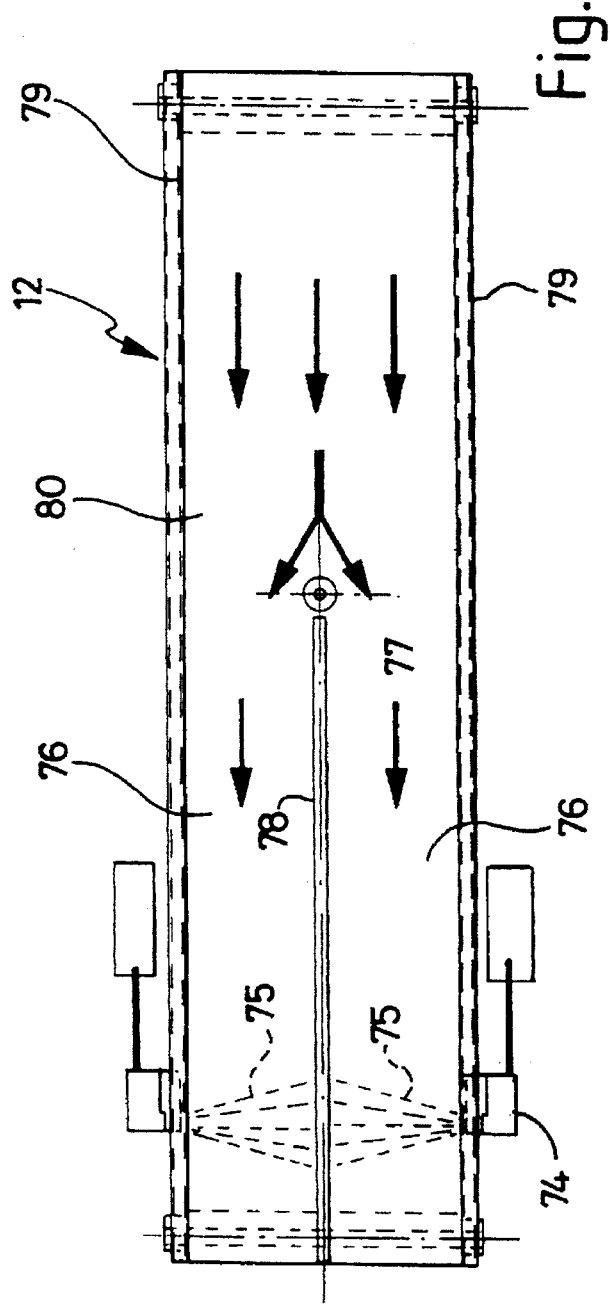
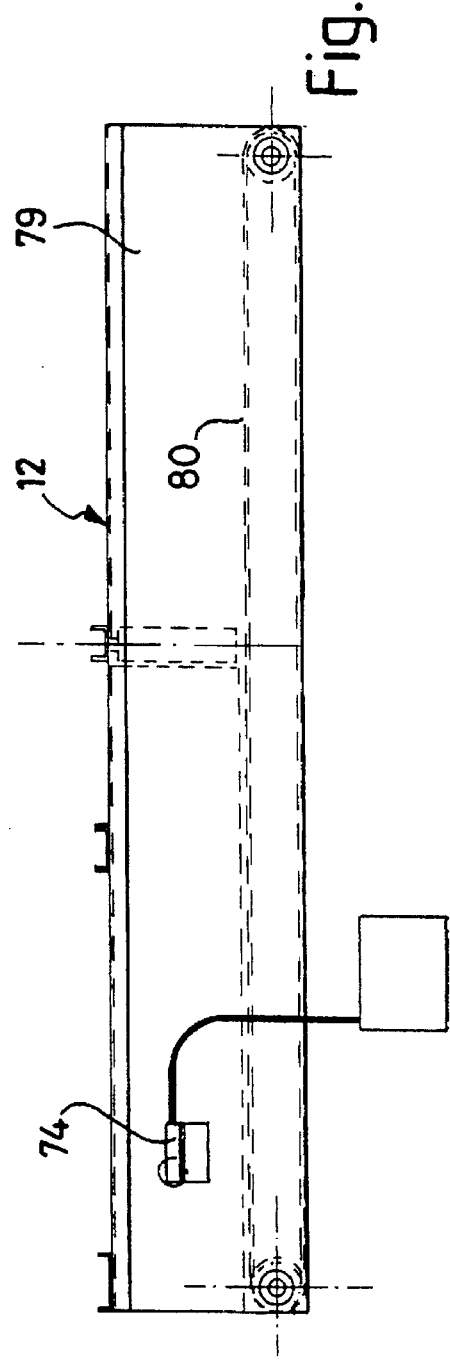

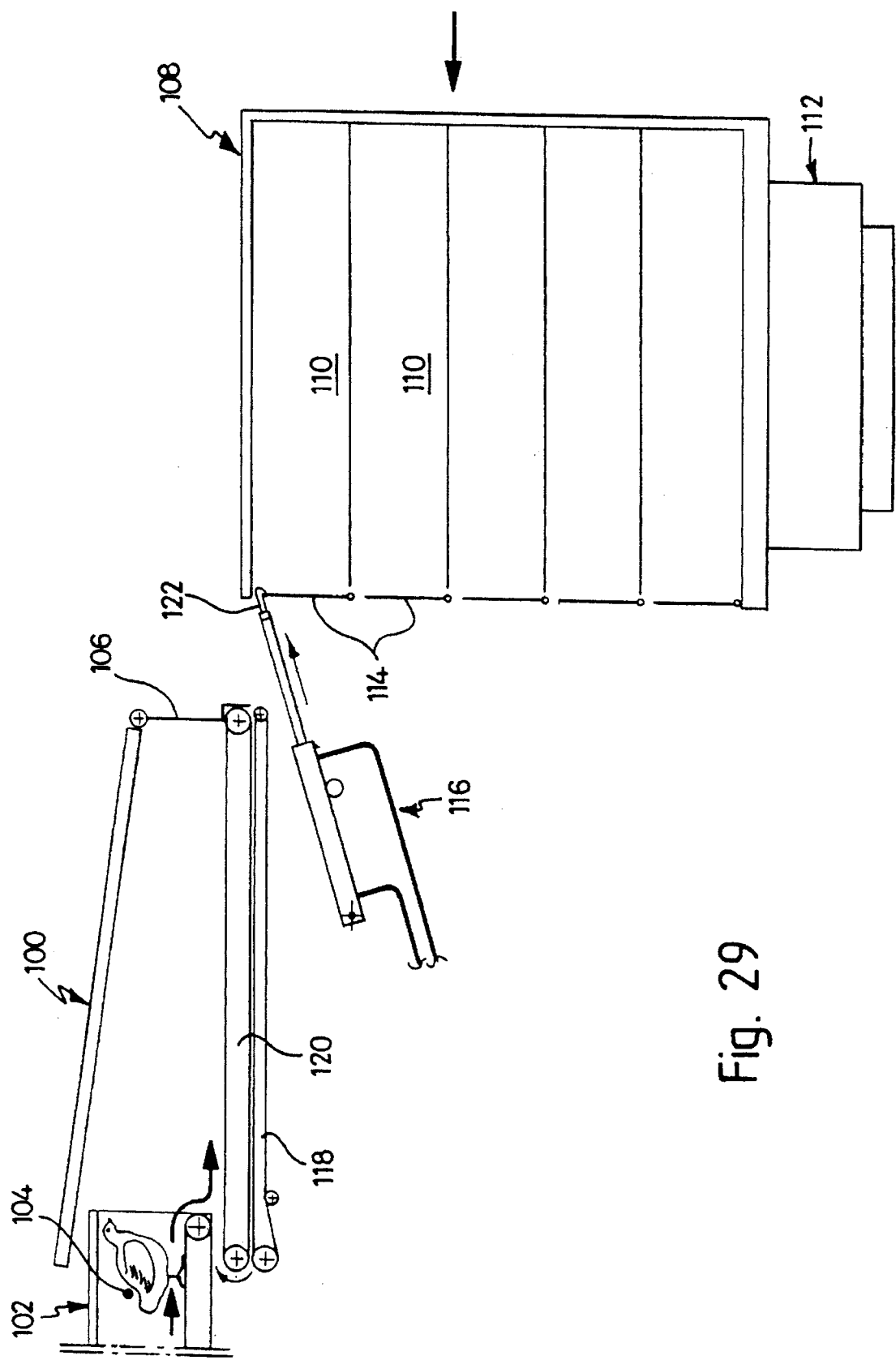

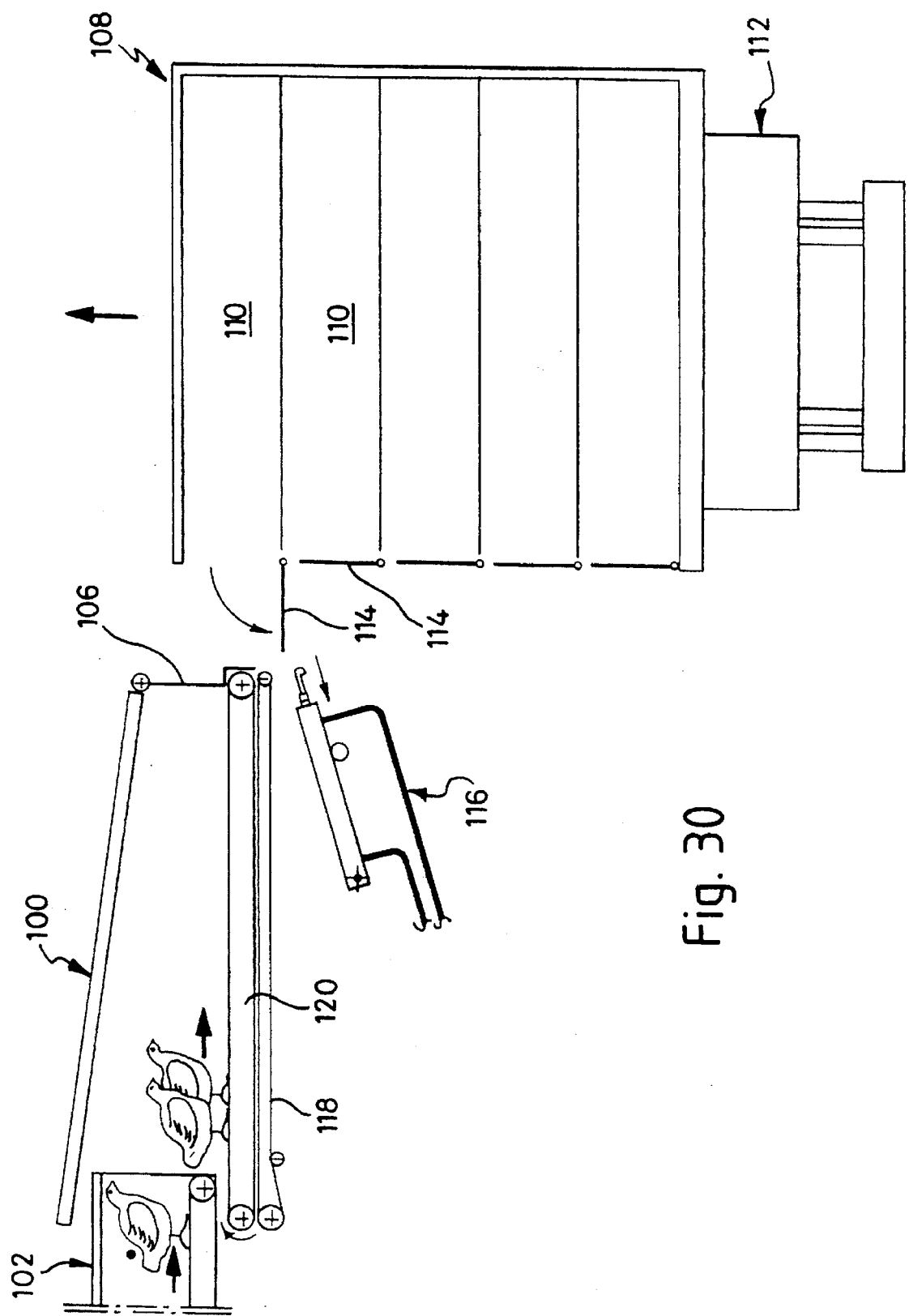

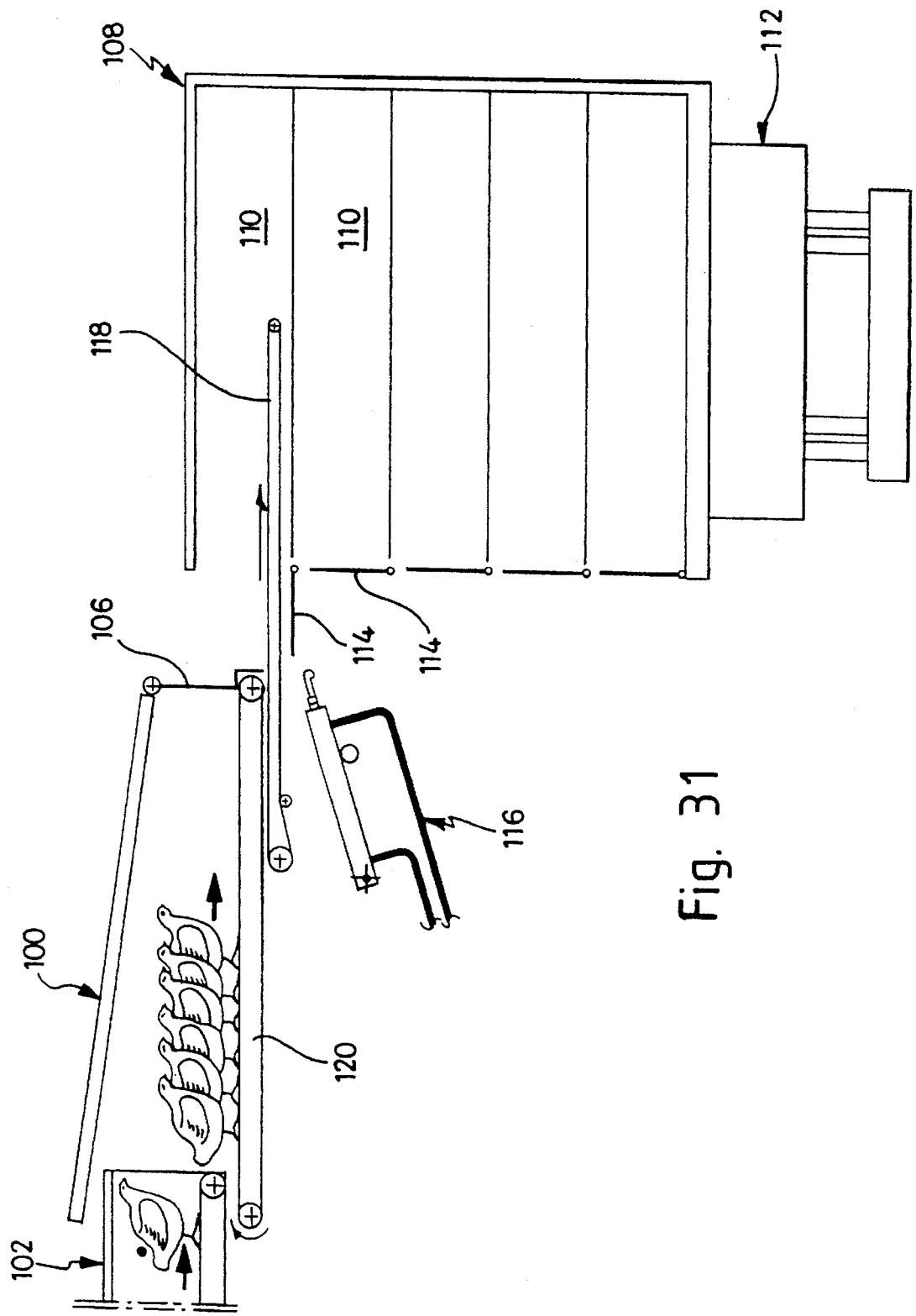

LIVESTOCK HANDLING APPARATUS AND METHOD

This invention relates to livestock handling apparatus and in particular to apparatus for loading poultry into containers. The invention also relates to a method of loading poultry into containers.

Conventionally, when live poultry in a growing house is ready to be slaughtered, the poultry is loaded into open-topped containers in the form of drawers a number of which, e.g. twelve, are accommodated in a module. The loaded modules are moved by a fork-lift truck onto a lorry which transports the modules to a processing factory at which the birds are unloaded and slaughtered. The process of catching the birds and loading them into the open-topped containers is generally done by operatives and is therefore labour intensive. The invention aims to automate the process of loading the poultry into the containers.

According to one aspect of the invention there is provided apparatus for loading poultry into containers, comprising a batching receptacle for receiving a batch of poultry corresponding to the capacity of a container, the batching receptacle having an input to receive the poultry and an output to discharge the poultry, the batching receptacle being operable to move the poultry from the input to the output, and shifting means for moving a container into the apparatus for loading the container with a batch of poultry from the batching receptacle and for discharging a loaded container from the apparatus. Preferably, the containers are open-topped containers.

Preferably, the batching receptacle has in its base a conveyor which is operative to move the poultry from an input end to an output end thereof, at which a movable door or flap may be provided, the door or flap being movable between a closed position in which it closes the output end and prevents the poultry leaving the batching receptacle and an open position in which poultry in the batching receptacle is allowed to pass into an open-topped container moved into the apparatus for loading thereof.

The batching receptacle may have sensing means which sense the weight of poultry in the batching receptacle and which, when a predetermined weight of poultry is reached, causes the door or flap to move to the open position to allow unloading of the batch of poultry from the batching receptacle into the appropriate container. Alternatively, the batching receptacle may batch by counting the number of birds in the batching receptacle and causing the door or flap to move to its open position when a predetermined number of birds has been received in the batching receptacle.

The batching receptacle may be vertically movable so as to be capable of alignment with a selected container in a stack or tier of containers accommodated in a module, in this case a loading conveyor which delivers poultry to the batching receptacle being capable of moving in a vertical plane to accommodate this vertical movement of the batching receptacle. As an alternative to the batching receptacle being shiftable vertically, the module may be vertically shiftable and the batching receptacle held stationary.

To increase poultry handling capacity, and to enable the apparatus to function with a standard module accommodating an array or matrix of containers, the batching receptacle and the shifting means preferably forms one loading unit of a plurality of such units arranged side by side and in respective alignment with the columns of the containers in the module, operation of the apparatus then being synchronised so that the loading conveyor is moveable horizontally to load the batching receptacles in turn, each hatching receptacle and the associated shifting means loading containers from successive levels of the appropriate tier of containers in turn, such that the capacity of the apparatus to batch the poultry matches the delivery rate of poultry to the apparatus by the loading conveyor.

According to another aspect of the invention there is provided a method of loading poultry into containers, comprising delivering the poultry to a batching receptacle until the receptacle contains a quantity of poultry corresponding to the capacity of a container, at which the supply to the receptacle is interrupted and the batch of poultry in the receptacle is delivered to a container occupying a loading position beneath the receptacle.

Preferably, the poultry is loaded into a succession of containers, each empty container being withdrawn from a module to occupy the loading position wherein it is filled with a batch of poultry and then replaced in the module as a filled container, a subsequent container then being withdrawn and filled in a process which sequentially fills the containers in the module.

Apparatus according to the invention is preferably rendered mobile by being mounted on wheels, for example on a trailer pulled by a prime mover such as a tractor, or on the load area of a truck or lorry, such a combination then constituting a mobile poultry packing machine. In a preferred arrangement, poultry is supplied to the packing machine at a receiving location, conveyors being provided to convey the poultry from the receiving location to the series of batching receptacles. The receiving location may be constituted by a catching unit, mounted on the front end of an arm which swings from side to side to gather poultry from a poultry house. However, a disadvantage of this arrangement is that the packing machine is a fairly bulky vehicle and the catching unit may not be able to reach all areas of poultry houses many of which have their internal areas interrupted by stanchions or posts supporting low roofs.

To overcome this possible disadvantage, apparatus according to the invention may be supplied with poultry by means of a separate catching vehicle capable of moving (independently of the apparatus) to catch live poultry, typically in a poultry house, and bring the poultry to a receiving point, such as a hopper, from where the poultry are conveyed to the series of batching receptacles.

The catching vehicle is preferably sufficiently compact and maneuverable to enable it to reach virtually all parts of the floor area of a typical poultry house, being able to pass into aisles defined by internal posts or stanchions in the house and being able to pass between such posts or stanchions. The catching vehicle may be comparable in size to a garden or horticultural tractor, and the latter may form the basic motive power unit for the catching vehicle.

A preferred embodiment of catching vehicle has a pair of conveyor arrangements on respective sides of the catching vehicle, the front end of each conveyor arrangement being equipped with a poultry catching head and the rear end being equipped with a flap controllably movable between a closed position closing the rear end of the corresponding conveyor arrangement and an open position in which poultry can be delivered from the rear end of the conveyor arrangement to the receiving point on the packing machine.

Each conveyor arrangement may itself be liftable between a lowered poultry-gathering position and a raised poultry-discharging position, and each conveyor arrangement may include a foremost elevating conveyor, extending upwardly and rearwardly towards an accumulating conveyor at the rear of which is located the controllably movable flap.

The receiving hopper at the receiving point of the packing machine may comprise a transport conveyor for conveying poultry away from the hopper and loading means for progressively loading poultry within the hopper into the transport conveyor, so that a substantially uniform flow rate of poultry from the hopper is achieved. Conveniently, the loading means comprise two base panels positioned on respective sides of the transport conveyor, the base panels being pivotable about substantially horizontal axes to respective raised positions in which each base panel is inclined downwardly towards the transport conveyor so that progressive pivotal movement of the two base panels from lowered positions thereof causes progressive delivery of poultry within the hopper onto the transport conveyor.

Figure 4:
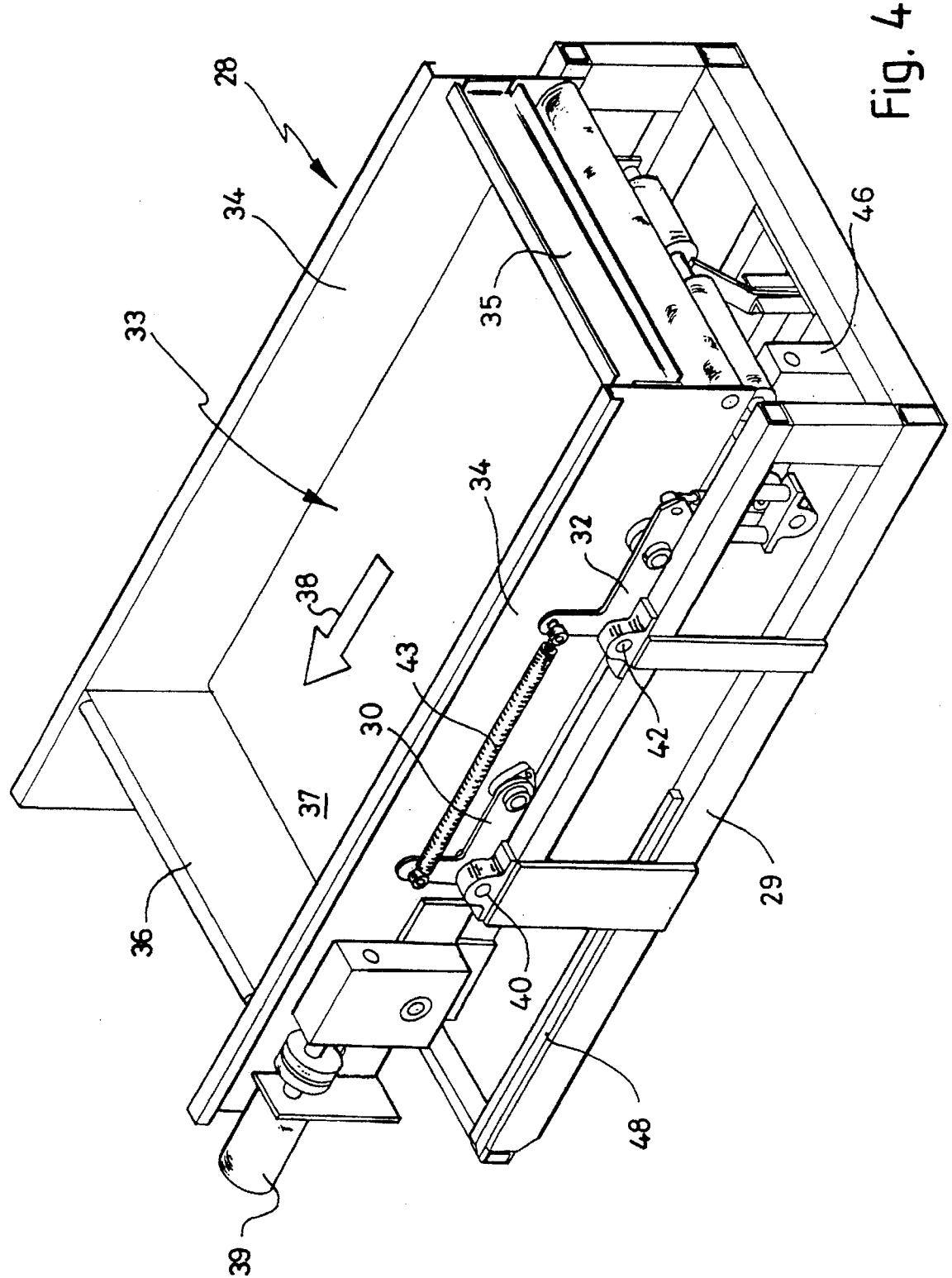

Apparatus according to the invention will now be described, by way of example, with reference to the accompanying drawing, in which:

FIG. 1 is a plan view of an assembly for gathering and loading poultry, the assembly including the batching apparatus according to the invention, FIG. 2 is a side elevation of the assembly of FIG. 1, FIG. 3 is an isometric view of the batching apparatus shown in its operative position beside a module accommodating containers, FIG. 4 is an isometric view of a loading unit of the batching apparatus, FIGS. 5 to 15 are diagrammatic views showing the operating sequence of the apparatus.

Figure 19:
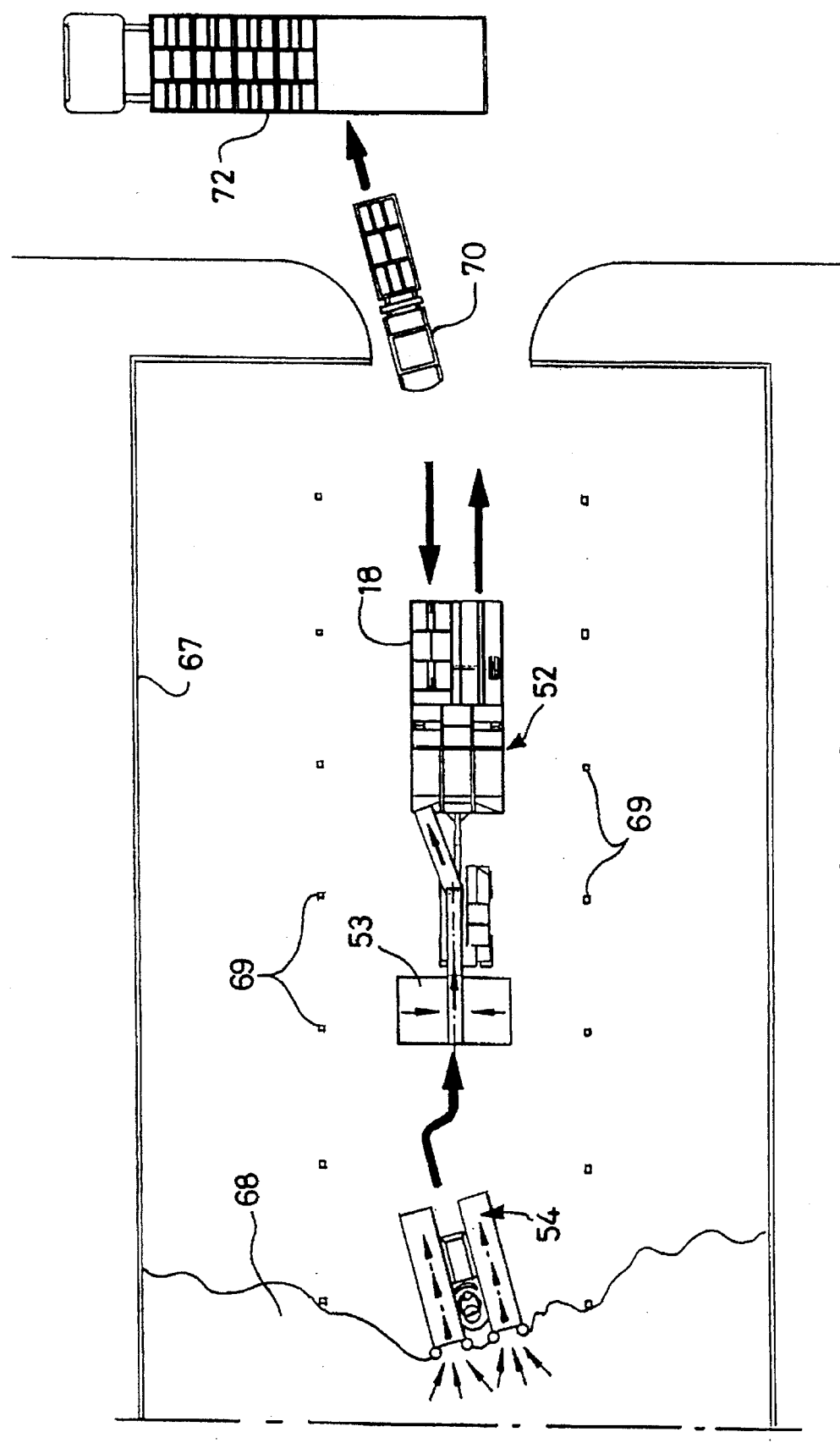
Figure 21:
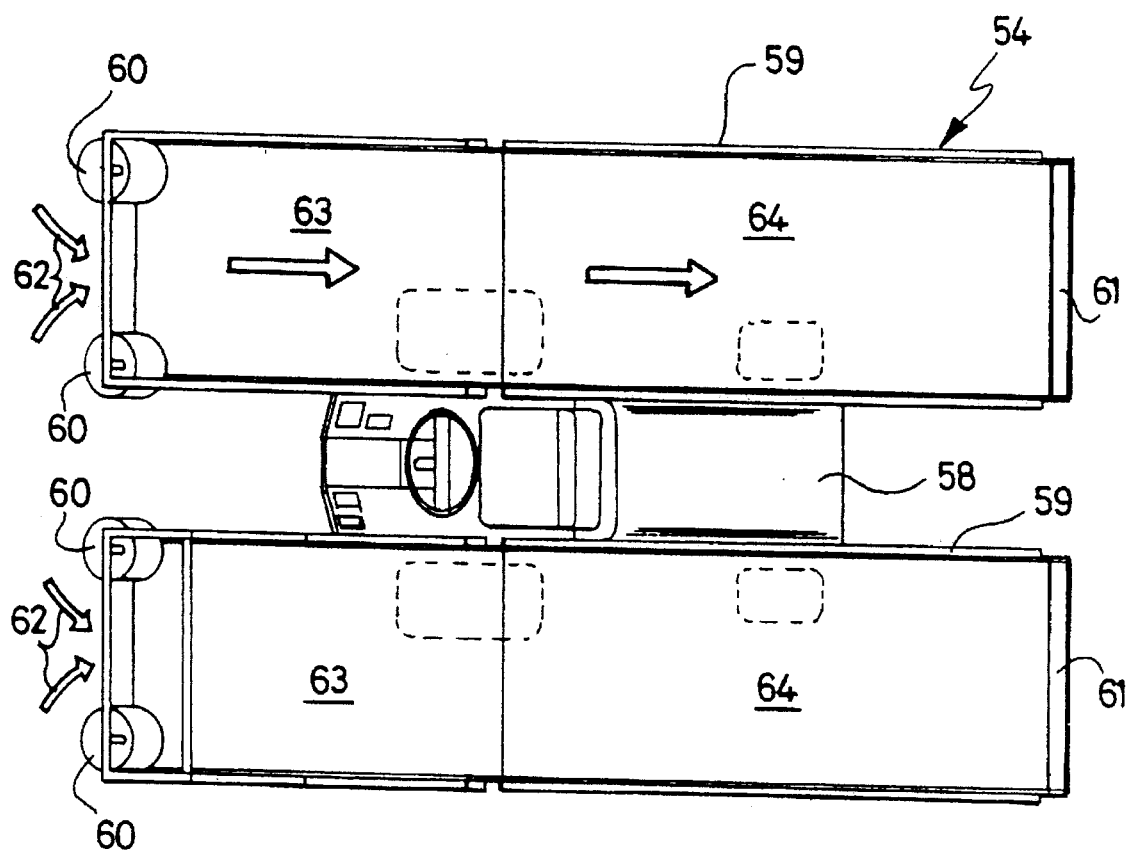
Figure 20:
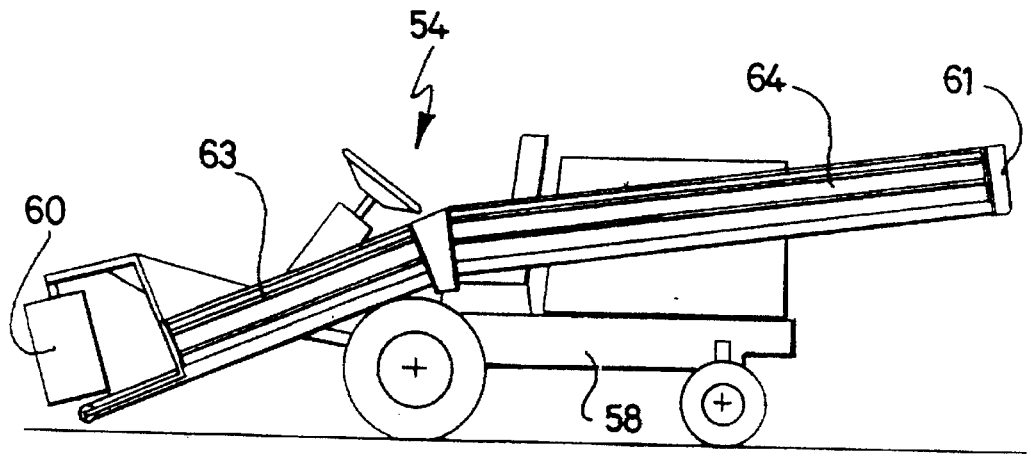
Figure 22:
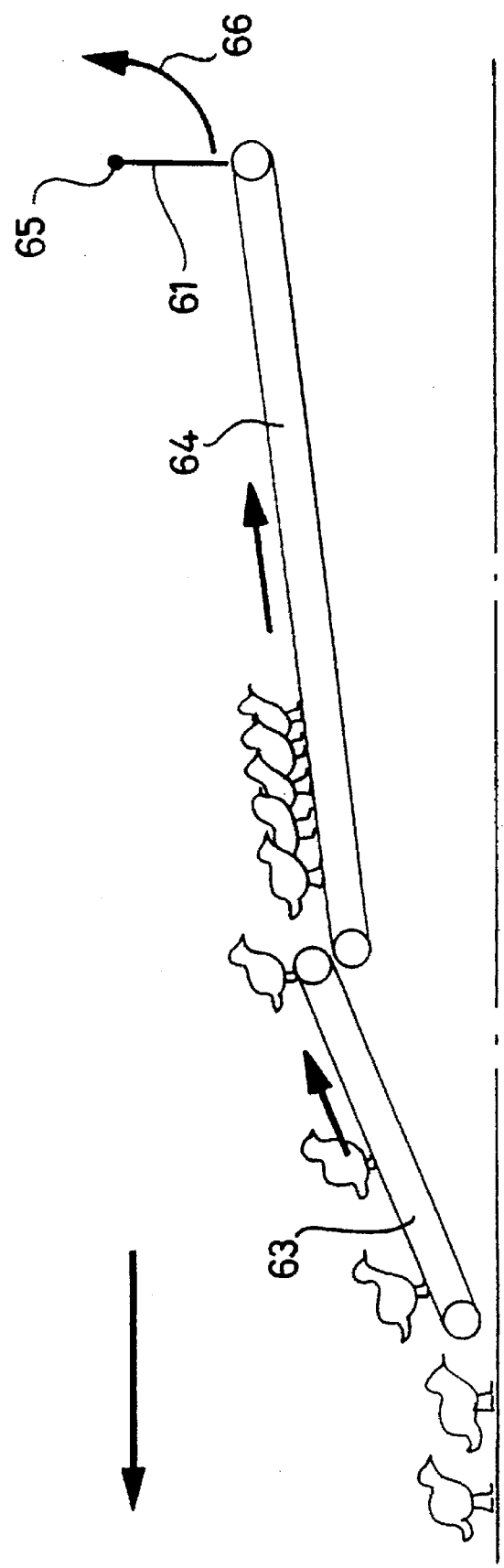
Figure 28:
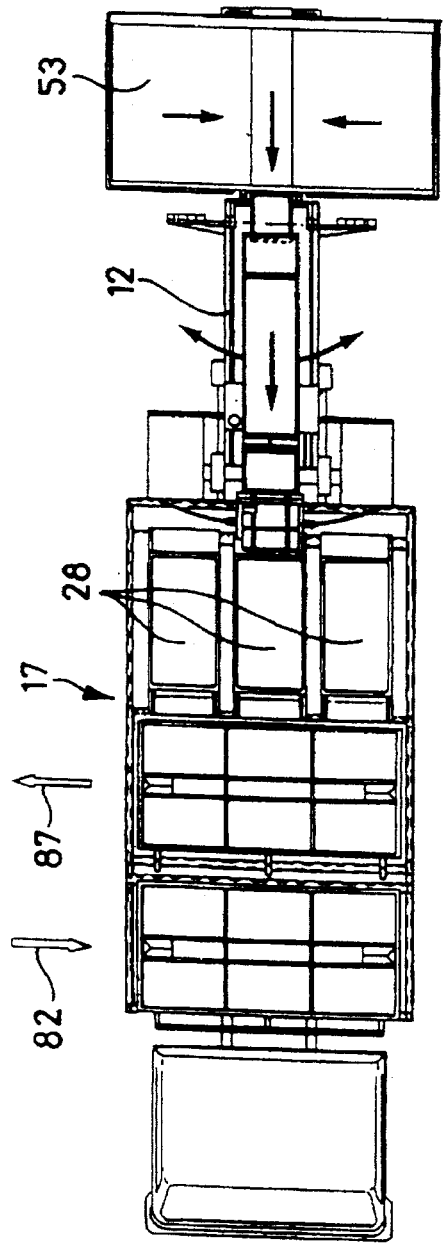
Figure 27:
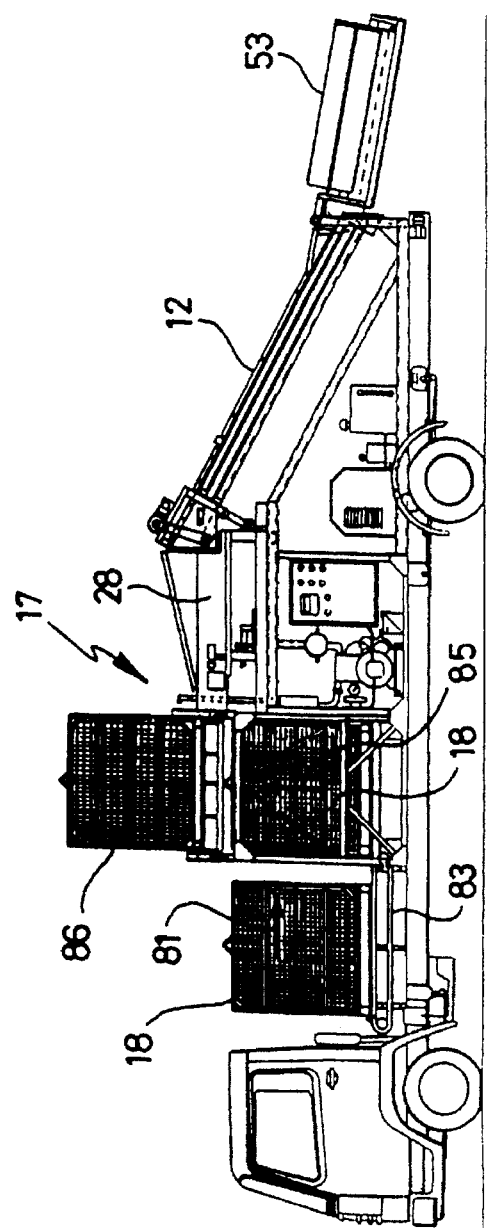

FIG. 16 is a side elevation of apparatus similar to FIG. 2 but modified to incorporate a hopper, FIG. 17 is a plan view of the apparatus of FIG. 16, FIG. 18 is a fragmentary end view of the hopper of the apparatus of FIGS. 16 and 17, FIG. 19 is a plan view of the apparatus of FIGS. 16 and 17 in use in a poultry shed in combination with a catching vehicle, FIG. 20 is a side view of the catching vehicle, FIG. 21 is a plan view of the catching vehicle, FIG. 22 is a diagrammatic side view illustrating the operation of the catching vehicle, FIGS. 23 and 24 illustrates two ways of operating the inventive apparatus which are possible alternatives to the operative arrangement of FIG. 19, FIGS. 25 and 26 are respectively a side elevation and plan view illustrating a conveyor modified to incorporate a counter, FIGS. 27 and 28 are respectively a side elevation and plan view illustrating a lorry having a load area carrying a modified form of apparatus, and FIGS. 29 to 33 respectively show in sequence the operation of a modified arrangement of batching apparatus, illustrated in diagrammatic manner.

FIGS. 1 and 2 illustrate a complete assembly for gathering live poultry, normally chickens, and loading them into containers in the form of open-topped drawers. The assembly comprises a tractor 1 drawing a wheeled trailer 2 having a chassis 3 supported by a pair of ground-engaging wheels 4. The tractor 1 and trailer 2 are capable of relative articulating movement about a vertical pivot axis 5 passing through the towing point. Forwardly of the tractor 1 projects an inclined elevating conveyor 6 the extreme lower end of which terminates in a poultry catching unit 7. The elevating conveyor 6 is capable of pivotal movement, with respect to the tractor 1, about a substantially vertical pivot axis 8 so that the catching unit 7 can be swung in an arcuate movement in front of the tractor, as indicated by the double-headed arrow 9 in FIG. 1.

The upper end of the elevating conveyor 6 is aligned with the forward end of a transfer conveyor 10 mounted on the tractor 1. The rear end of the transfer conveyor 10 communicates with the front end of a loading conveyor 12 which is capable of pivotal movement with respect to the tractor 1 about two orthogonal axes, namely a vertical axis coincident with the axis 5 and a horizontal transverse axis 13. As a result, the loading conveyor 12 can swing, with respect to the tractor 1, in a generally horizontal plane as indicated by the arrow 14 in FIG. 1, and in a generally vertical plane as indicated by the arrow 15 in FIG. 2. This enables the rear end 16 of the loading conveyor 12 to deliver poultry to the hatching apparatus of the invention, this apparatus being indicated generally at 17 in FIGS. 1 and 2. It will be noted that the apparatus 17 occupies a forward portion of the chassis 3, the rear portion of which is occupied by means for supporting and moving modules 18 holding the drawers 19.

The tractor 1 is driven forwardly into an area, such as a growing house, containing poultry and the elevating conveyor 6 is swung from side to side so that the catching unit 7 sweeps across an area in front of the tractor 1 and gathers live chickens which pass up the elevating conveyor 6, along the transfer conveyor 10 and then into the loading conveyor 12 whence they are delivered to the batching apparatus 17 which operates to fill the drawers 19 of each module 18 with live poultry.

It will be appreciated that the conveyors 6, 10 and 12 are provided with covers to prevent the poultry escaping.

Referring to FIG. 1, when the module 18 is in the position 22, the drawers in the module 18 are filled successively by the batching apparatus 17 until all the drawers are filled. The filled module 18 is then moved to occupy position 24, (shown unoccupied in FIG. 1) ready to be removed by a fork-lift truck as indicated by arrow 23. A module of empty containers in position 20 is moved to position 22, a module of empty containers being moved into position 20 by the fork-lift truck, as indicated by the arrow 25. Movement of the modules on the trailer from position 20 to position 22 and from position 22 to position 24 is effected by a chain drive on the trailer 2 which is driven in intermittent fashion in synchronism with the operation of the batching assembly 17.

Instead of using the described poultry catching unit 7 together with the elevating conveyor 6 these two items could be omitted and the front of the tractor 1 could be fitted with a receiving hopper or reservoir for live poultry from which the poultry is fed direct to the batching apparatus 17 via conveyors 10 and 12. An arrangement utilising a hopper is described subsequently.

The invention is principally concerned with the batching apparatus 17 which receives the poultry from the loading conveyor 12 and which then loads the drawers 19 in the modules 18, and the following description is mainly devoted to the explanation of the structure and operation of the hatching apparatus 17.

Referring to FIG. 3, in which the trailer 2 is omitted, the batching apparatus 17 comprises a frame 26 on which is mounted by a scissors lift 27 an assembly of three loading units 28 arranged side by side. Beside the apparatus is illustrated the module 18 (in position 22) consisting of a rectangular frame accommodating open-topped containers each in the form of an open-topped plastics drawer 19. The module 18 accommodates twelve drawers 19, arranged in three tiers or columns each consisting of four drawers.

A representative one of the loading units 28 is shown in FIG. 4. The loading unit 28 has a support frame 29 of the upper part of which is mounted, by pivot arms 30, 32, a tray-like receptacle 33 consisting of two spaced side panels 34, an end panel 35, a movable flap 36 and a conveyor 37 movable in the direction of the arrow 38 by means of a motor/gearbox 39. There are two pivot arms 30, 32 on each side of the loading unit, and each pivot arm takes the form of a bell-crank lever pivotally mounted in a respective bearing 40, 42 on the support frame 29. The horizontal lever arm of the lever 30 is pivotally mounted on a corresponding side panel 34 and the upper ends of the vertical levers are interconnected by a link 43. When a weight is placed on the conveyor 37, the tray-like receptacle 33 tends to move downwards with attendant pivoting of the pivot arms 30, 32, this tendency being opposed by a counterweight 44. This arrangement provides the receptacle with a weight sensor and renders the receptacle 33 weight sensitive.

Figure 5:
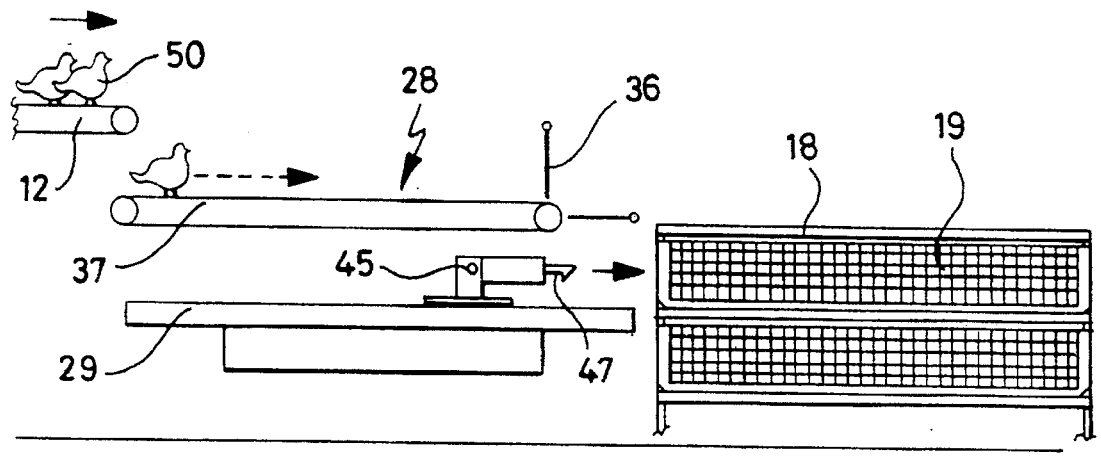
Figure 6:
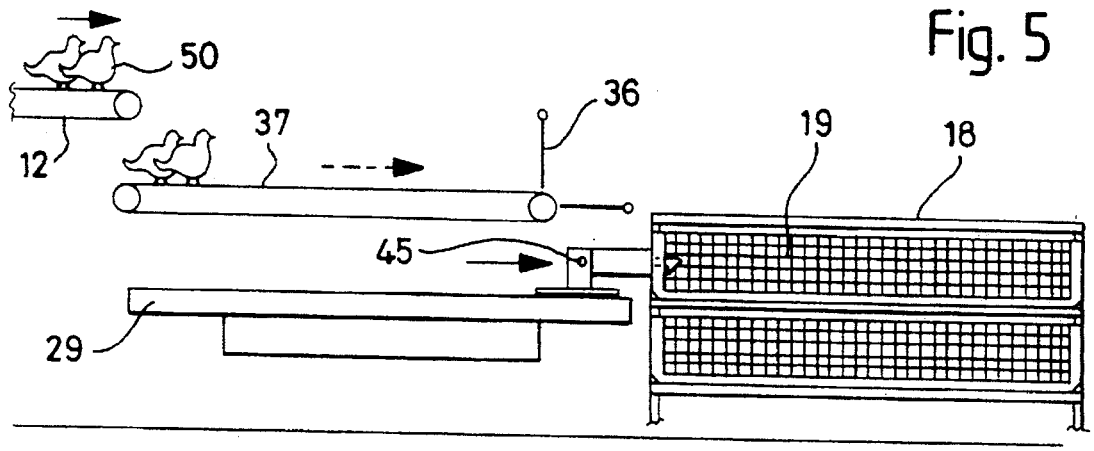

The support frame 29 also supports a carriage for withdrawing individual drawers from the module 18 for loading with poultry and for pushing loaded drawers back into the module. The carriage is hidden from view in FIG. 4 but is shown diagrammatically at 45 in FIGS. 5 to 15. The carriage 45 is movable horizontally in the support frame 29 between a fully retracted position (FIGS. 7, 8 and 9) and a fully extended position (FIG. 6). The carriage 45 is driven by a motor/gearbox shown at 46 in FIG. 4. The carriage 45 presents a hook 47 (or hooks) which faces the module 18 and which is engageable with an individual drawer 19, so that return movement of the carriage 45 pulls the drawer 19 out of the module 18 into a loading position in which the drawer 19 is located beneath the conveyor 37, ready to be filled with a batch of poultry on the conveyor 37. To facilitate sliding movement of the drawers 19, the upper surface of the support frame 29 carries guide rails 48 (FIG. 4).

The receptacle 33 is in practice provided with a top cover which prevents escape of poultry but which is omitted from the drawings for clarity. The cover is arranged to allow poultry to enter the receptacle 33 from the end 16 of the conveyor 12.

Considering the apparatus to be in the position shown in FIG. 3, assume that the conveyor 12 is about to deliver poultry to the left-hand unit 28 in FIG. 3, i.e. the upper unit 28 as viewed in the plan of FIG. 1. FIGS. 5 to 15 are diagrammatic views of the apparatus 17 on looking in the same direction as FIG. 2. Referring to FIG. 5, the unit 28 is initially empty of poultry, the carriage 45 is at its rest position and the module 18 contains twelve empty drawers 19. The end 16 of the conveyor 12 is positioned above the end panel 35 so that chickens 50 are delivered onto the conveyor 37. This is driven in an incremental stepwise fashion so that the chickens are moved from the inlet end of the conveyor 37 towards the outlet end thereof where the flap 36 is in its closed position. In FIGS. 5 to 15, the flap 36 is shown as two pivoted flaps, one closing the output end of the receptacle and the other closing the gap over the drawer 19. The two flaps may be separate but linked or may be provided by a single component suitably shaped.

Figure 7:
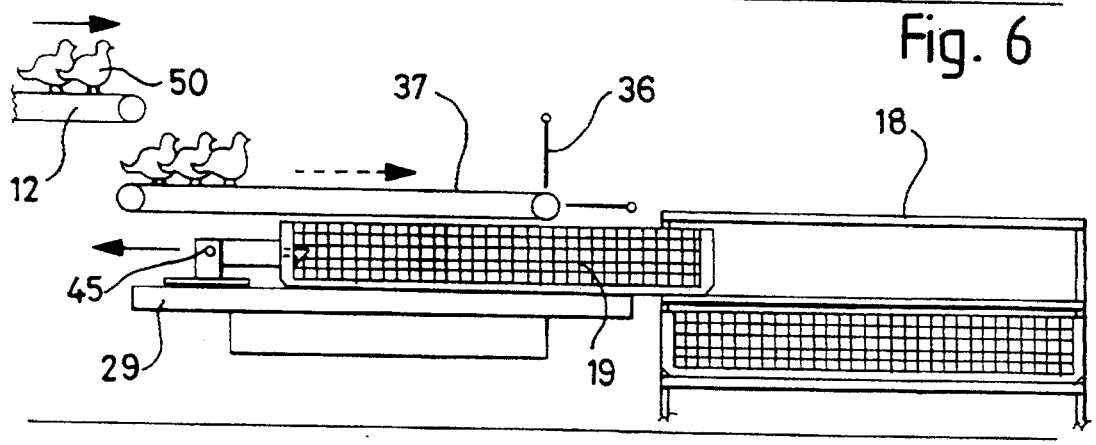
Figure 8:
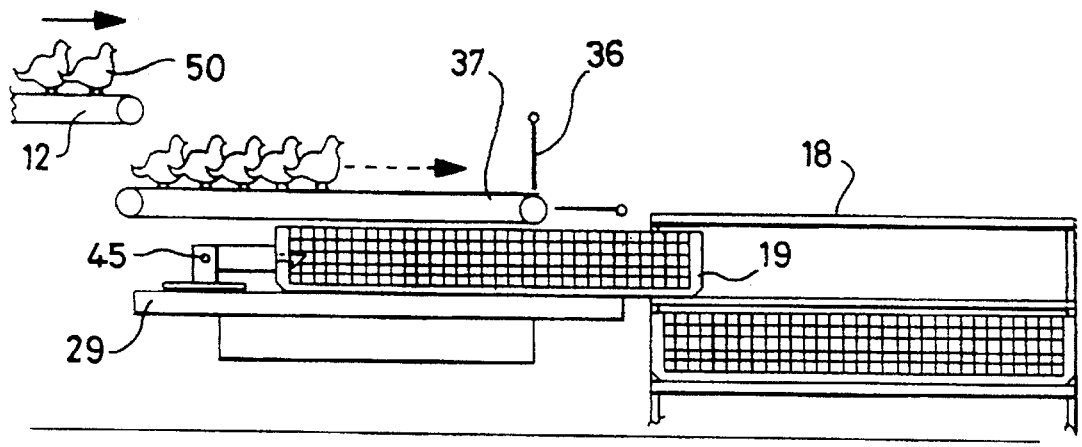

The carriage 45 is then moved towards the module 18, the hook 47 engaging the end of the topmost drawer 19 of the stack of drawers with which the unit is aligned (FIG. 6). Retraction of the carriage 45 causes the drawer 19 to be pulled into the apparatus (FIG. 7). The drawer 19 is withdrawn from the module 18 sufficiently for the drawer to be loaded with poultry from the conveyor 37, but the drawer 19 is not completely withdrawn from the module 18, so avoiding the need for re-registration of drawer and module compartment when the loaded drawer is pushed back into the module.

Figure 9:
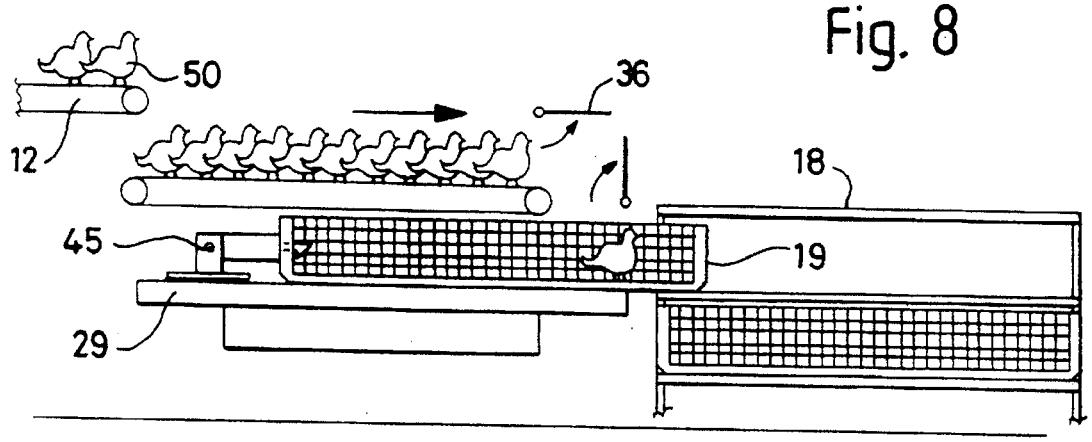
Figure 10:
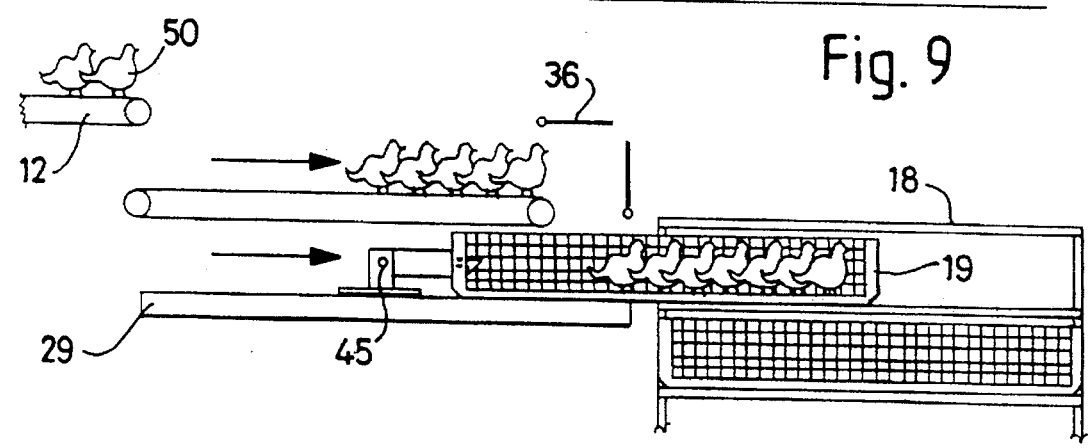

At this point in the cycle (FIG. 8), the conveyor 37 is continuing to move incrementally and is therefore filling with poultry from the conveyor 12, the flap 36 being closed and preventing poultry escaping from the output end of the conveyor 37. When a predetermined weight of poultry has been loaded onto the conveyor 37, the weight sensor associated with the receptacle 33 trips. This causes the conveyor 12 to stop, the flap 36 to open and the conveyor 37 to be driven in a continuous movement to unload the batch of poultry into the open topped drawer 19 below (FIG. 9). As loading of the drawer proceeds, the carriage 45 pushes the drawer 19 towards the module 18 (FIG. 10). The speed of movement of the drawer 19 preferably corresponds to the speed of movement of the conveyor 37 but these speeds could differ.

Figure 11:
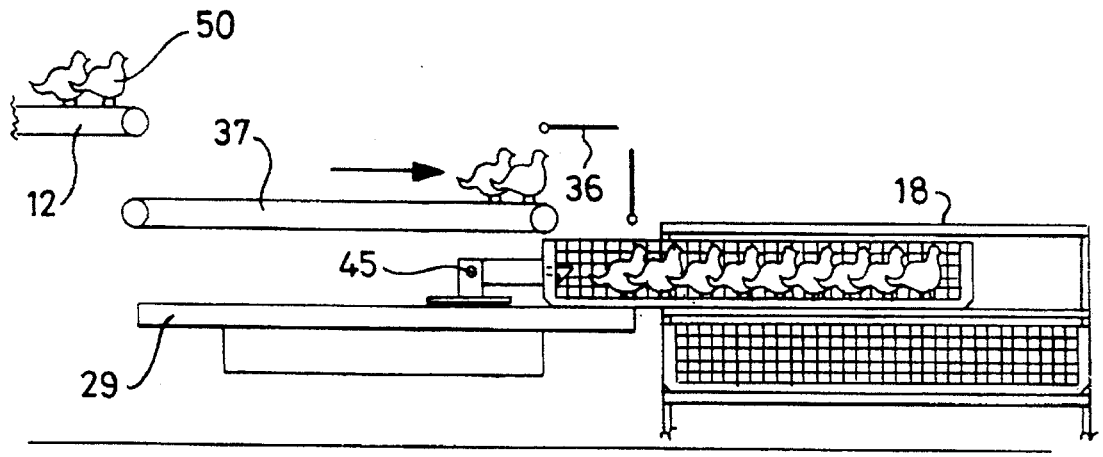
Figure 12:
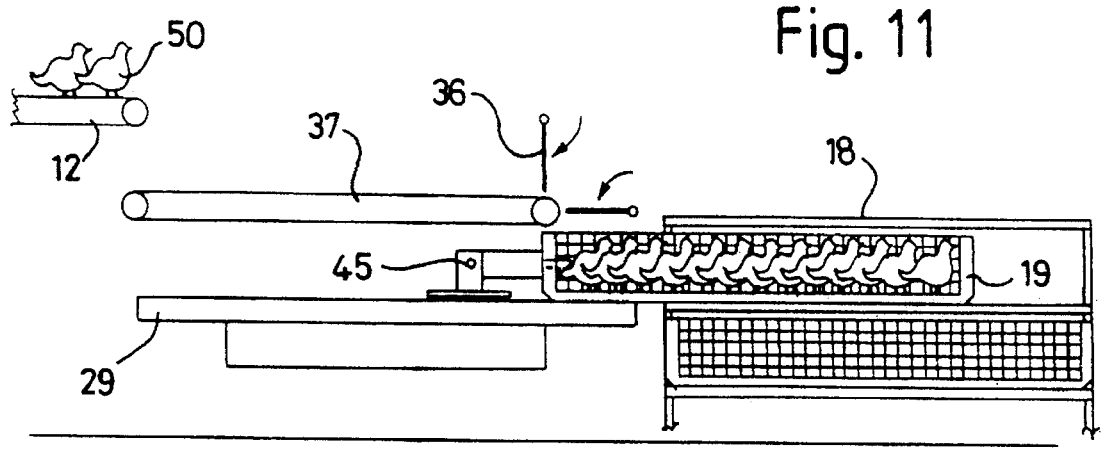
Figure 13:
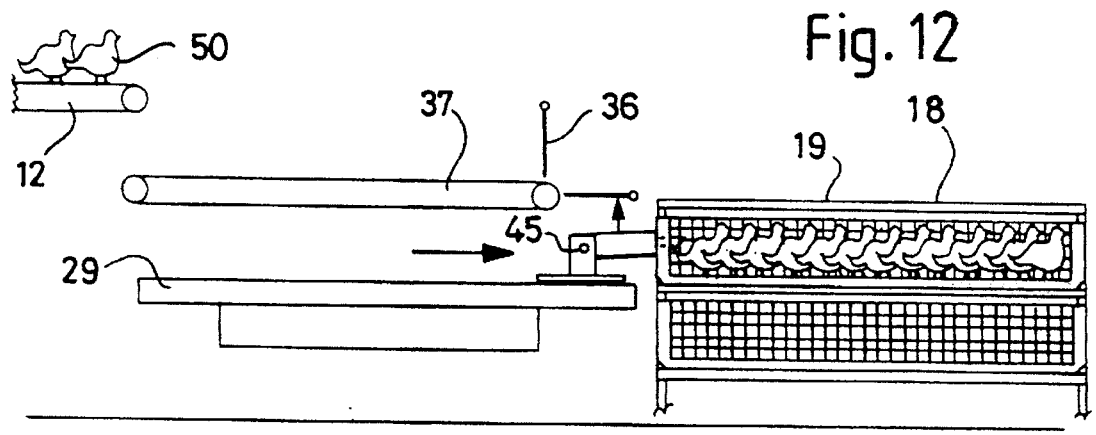

The drawer 19 stops momentarily with its trailing end under the outlet end of the conveyor 37 which continues to be driven to transfer any birds remaining on the conveyor 37 into the drawer 19 (FIG. 11). The flap 36 closes to cover the end of the drawer and also to close the outlet end of the conveyor 37 (FIG. 12). Hence, the batch of poultry which had previously been in the receptacle 33 and which has a predetermined weight corresponding to the capacity of the drawer 19 has now been transferred to the drawer 19.

Figure 14:
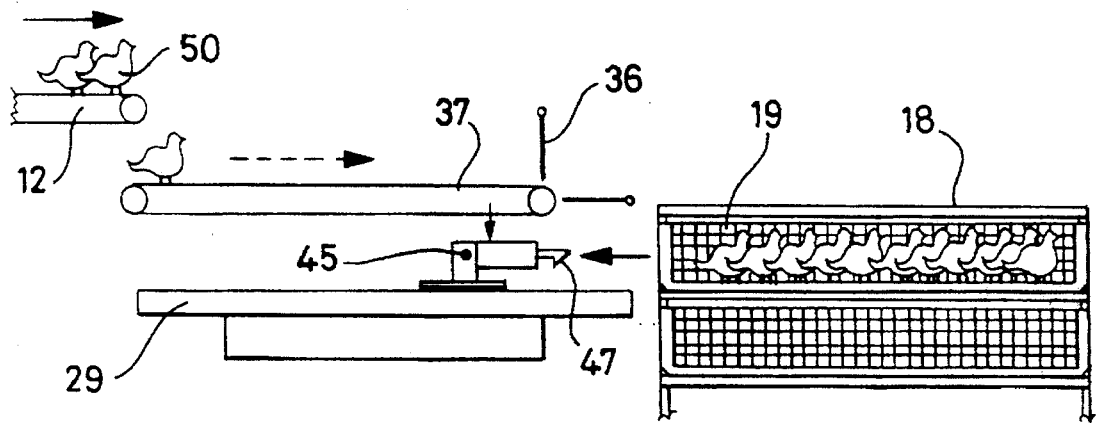
Figure 15:
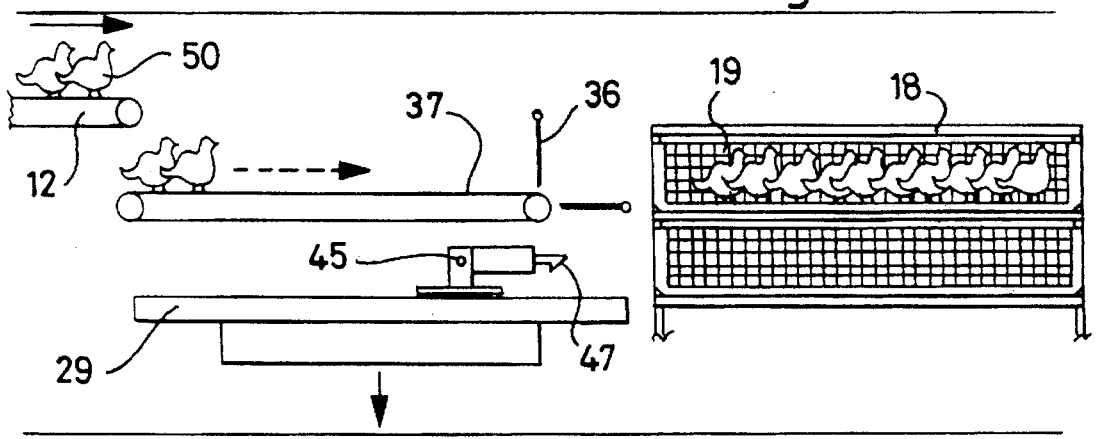

Continued movement of the carriage 45 pushes the drawer 19 back into its compartment in the module 18. The hook 47 is lifted (FIG. 13) to disengage the carriage 45 and drawer, and the conveyor 37, together with its weight sensor, is reset. The conveyor 12 is restarted, the conveyor 37 resumes its incremental movement and the carriage returns to its initial rest position with its hook 47 raised. On reaching the initial rest position, the hook 47 is lowered (FIG. 14). The loading unit 28 is now shifted vertically downwards, by means of the scissor lift 27, so that the carriage 45 is at the appropriate position to withdraw the drawer at the next lower level. This drawer 19 is then filled with poultry by a repetition of the sequence described above. The drawers 19 at the two lower levels are sequentially filled in a comparable manner, after which the scissor lift raises the unit to the top drawer level ready for the process to be repeated on the next module.

The loading unit 28 shown in FIG. 4 is triplicated in the apparatus shown in FIG. 3 to provide the complete apparatus with sufficient poultry-handling capacity. In use, the conveyor 12 moves step-wise and horizontally above the three loading units 28 so as to load the units in sequence. When all the drawers 19 in a module 18 are filled with poultry, the module is shifted to position 24 ready to be removed by a fork lift truck, as previously described.

The sequence of operations performed by the apparatus is controlled by software. The capacity of the apparatus to fill the drawers matches the expected delivery rate of poultry to produce an efficient automated loading process which avoids handling by operatives and causes minimum distress to the poultry.

The described apparatus and method can be modified in a number of ways, including:

(1) The inch rate of the conveyor 37 when being loaded can be determined by either:
  (a) Direct speed ratio adjustment with conveyor 12
  (b) Sensing of birds present on conveyor 12 and operating weight conveyor belt drive only when birds present
  (c) A combination of (a) and (b).
  (d) by sensing the volume and/or weight of birds on the conveyor 37.
(2) The conveyor 37 can be designed to either use a deadweight counterbalance mechanism with variable tare weight or alternatively be load cell mounted.
(3) If birds are counted then the conveyor 37 is used purely for transfer to the drawer.

(4) The birds could be counted either on the conveyor 12 or the conveyor 37.

(5) The gate flap 36 can be either:
   (a) Free pivoting
   (b) Externally actuated
   (c) Actuates in conjunction with drawer flap.

(6) The drawer flap can be externally actuated independently or alternatively actuated in conjunction with another part of the mechanism.

(7) The drawer pull carriage 45 has an attachment means which captures the drawer. In this example a hook 47 has been used but other methods are possible.

(8) It is possible to load birds into the drawer when it is being moved in either direction, therefore, for example, it is possible during the stages of FIGS. 10 and 11 to push or pull the drawer during loading, provided that the drawer always remains under the drawer flap aperture. Similarly, the drawer pull out could be halted during the stage of FIG. 7 so that the drawer halts under the end of the conveyor 37 (same position as FIG. 11) and waits for the conveyor 37 to trip. Upon tripping, the drawer would then be pulled back to the rearmost position as bird transfer commenced (FIG. 9) and then pushed forward whilst transfer continued (FIG. 10). Operation from FIG. 11 onwards then remains the same.

The complete assembly shown in FIGS. 1 and 2 constitutes a mobile poultry packing machine which has, in addition, a poultry catching unit 7. The mobile packing machine and catching unit 7 operate satisfactorily when the chickens to be caught are accommodated in a large unobstructed space which allows sweeping movement of the catching unit 7. However, many poultry houses have internal posts or stanchions making access difficult to a large machine like that of FIGS. 1 and 2. Moreover, poultry houses commonly have low roofs, giving insufficient internal height for satisfactory access and operation of the packing machine of FIGS. 1 and 2. The arrangements of FIGS. 16 to 24 are intended to overcome these possible problems.

Referring to FIGS. 16 to 19, the mobile packing machine 52 illustrated therein is identical to that of FIGS. 1 and 2, except that at the forward end the packing machine 52 has a reception hopper 53 which is supplied with poultry by a separate catching vehicle 54 (FIGS. 19 to 22). The hopper 53 is mounted at the front of the tractor 1 and comprises a central transport conveyor 55 which is driven in the direction of the arrow to deliver poultry to the conveyor 10 and thence, via the horizontally and vertically pivotable conveyor 12, to the batching apparatus 17.

On respective sides of the transport conveyor 55, the hopper has two panels 56 which are pivotable about substantially horizontal axes 57 (FIG. 18) at their inboard edges, so as to be movable between lowered positions (full lines in FIG. 18) and raised positions (broken lines in FIG. 18). In their raised position, the panels 56 converge downwardly towards the conveyor 55. Therefore, progressive pivotal movement of the panels 56 from their lowered positions to their raised positions causes progressive delivery, by a gentle and progressive tipping action, of poultry within the hopper onto the conveyor 55.

Reference will now be made to FIGS. 20, 21 and 22 which show the catching vehicle 54. This is a separate motive power unit, for example based on a small four-wheeled, diesel-engined horticultural or garden tractor 58 modified in the manner to be described to render it suitable to catch, hold and transfer poultry to the hopper 53.

On respective sides of the tractor are fitted conveyor assemblies 59. These are identical and each is movable between a raised transport position (for transport to the hopper and unloading onto the hopper 53) and a lowered position (for catching birds from the poultry house floor). Each assembly 59 comprises, starting at the front thereof and moving rearwardly: a poultry catching head 60 which is operative to gather poultry and draw the birds onto the front of the conveyor assembly 59, (arrows 62); an elevating conveyor 63 onto which the poultry is delivered by the head 60; an accumulating conveyor 64 onto which the poultry is delivered by the elevating conveyor 63; and a flap 61 pivotally movable about a substantially horizontal axis 65 (FIG. 22) along its top edge between a closed position (full lines in FIG. 22) and an open position displaced from the closed position by about 90°, as indicated by the arrow 66 in FIG. 22.

FIG. 19 shows the poultry packing machine 52 (with hopper 53) positioned in the central aisle of a poultry house 67. The catching vehicle 54 is advancing into the flock of chickens 68 confined within the house 67. The catching vehicle 54 is sufficiently compact and maneuverable to pass between the vertical posts 69 of the poultry house 67 and to enter the side aisles of the house, whilst the poultry packing machine 52 remains in its illustrated position in the central aisle. As the catching vehicle 54 moves forwardly into the flock of chickens, the birds are gently gathered and transferred from the floor of the poultry house onto both elevating conveyors 63 which are driven at a sufficient speed to keep the catching heads 60 clear. The birds are carried up the elevating conveyors 63 and delivered onto the respective accumulating conveyors 64. The flaps 61 are maintained in their closed positions to cause the birds to accumulate on the accumulating conveyors 64.

When the correct number of birds have been lifted onto the accumulating conveyors 64, determined either by the operator driving the catching vehicle 54 or by an automatic weight or number sensing device, the elevating conveyors 63 and accumulating conveyors 64 are stopped and raised to their transport positions with the accumulating conveyors 64 horizontal. The catching vehicle 54 is then driven back to the hopper 53. On reaching the hopper 53, the catching vehicle is reversed up to the hopper to allow the rear of the accumulating conveyors to overhang the hopper. The flaps 61 are then pivoted to the open positions and the drive to the conveyors 63 and 64 is applied to cause the birds on the accumulating conveyors 64 to be transferred onto the hopper 53 which at this stage has its conveyor 55 running and its panels 56 in the lowered positions thereof. A sensing device on the hopper 53 detects the presence of the catching vehicle 54 and acts to ensure that the conveyor 55 is driven and the panels 56 remain in their lowered positions during the final approach of the catching vehicle 54, its unloading and its departure. During unloading of the birds into the hopper 53, the catching vehicle 54 may be reversed with an inching movement to promote even distribution of the birds on the area of the hopper 53.

At the conclusion of the transfer of the birds from the two accumulating conveyors 64 to the hopper 53, the flaps 61 are returned to their closed positions and the catching vehicle 54 moves away from the hopper 53 towards the flock of chickens remaining on the floor of the poultry house 67. On reaching the flock, the catching vehicle operator lowers the elevating and accumulating conveyors 63, 64 and catching heads 60 to their operative positions (FIG. 22), starts the catching heads 60 and conveyors 63, 64 and repeats the gathering, accumulating and delivery cycle.

After the catching vehicle 54 leaves the hopper 53, the hopper panels 56 are pivoted to their raised positions, either in a continuous movement or in a series of indexing movements, by hydraulic cylinders. The raising of the panels 56 causes the birds to slide down on the transport conveyor 55. After a predetermined time the panels 56 are returned to their lowered positions ready for the next approach of the catching vehicle 54.

FIG. 19 illustrates how a forklift truck 70 transfers filled modules (from the position 24 on the trailer 3) to a road transport vehicle 72 drawn up outside the access door of the poultry house 67. On the return trip of the forklift truck 70, empty modules are transferred from the road transport vehicle to the packing machine 52. There may be situations where it is more convenient for the packing machine 52 not fully to enter the poultry house 67. For example, the packing machine 52 may be positioned so that it is partially inside and partially outside the poultry house, it being appreciated that the hopper end of the packing machine 52 will face the poultry to be gathered so that the catching vehicle 54 can gain access to the hopper 53.

FIG. 23 illustrates a possible positioning in which the hopper 53 is positioned in the access doorway of the poultry house 67, and FIG. 24 shows the possibility of the poultry packing machine 52 being built on a road transport vehicle which is positioned wholly outside the poultry house, the catching vehicle 54 transferring the poultry from inside the house to the hopper 53 outside the house. In this case modules are loaded on and off the trailer 3 from the side thereof.

In each of the described arrangements using a catching vehicle, two operatives only are required, one to drive the catching vehicle 54 and the other to drive the forklift truck 70.

More than one catching vehicle 54 can serve a single packing machine 52. Birds may be loaded into the hopper 53 by other means, e.g. manually by a conveyor.

In each loading unit 28 previously described, the receptacle 33 has a weight sensor which means that each batch of poultry transferred to a drawer 19 corresponds to a predetermined minimum weight, or falls within an acceptable weight range. Batching of the poultry may alternatively be done by counting the chickens instead of weighing them, and this possibility is illustrated in FIGS. 25 and 26.

One of the conveyors transporting the chickens to the apparatus 17 is equipped with a counter. In the example of FIGS. 25 and 26, the conveyor 12 is shown fitted with a counter 74 in the form of a photoelectric device which scans the conveyor 12 adjacent its downstream end, the scan being represented diagrammatically by the broken lines 75. Ultrasonic sensors may alternatively be used. The width of the conveyor 12 is divided into two channels 76 by a dividing roller 77 followed by a vertical partition 78. The roller 77 is fixed (or alternatively rotatable about a vertical axis) and the partition 78 is fixed with respect to side walls 79 and a top panel of the conveyor, the movable belt of which is shown at 80. The roller 77 and the partition 78 cause the approaching chickens to be divided into two streams (in the respective channels 76), as indicated by the arrows in FIG. 26. In each channel 76, the chickens are in single file to enable accurate counting to be undertaken by the counter 74. The width of the conveyor 12 may be divided into more than two channels by the use of additional partitions.

The photoelectric devices of the counter 74 are linked to a microprocessor which includes means for counting the chickens passing the counter. A predetermined count may be entered into the microprocessor so that when this count is reached the conveyor belt 80 is stopped and the counted batch of chickens in the receptacle 33 is emptied into a corresponding drawer 19. It will be appreciated that if the apparatus includes a counter, the receptacle does not need to be fitted with a weight sensor, although both may be employed together, e.g. where the batches are to have defined weights and defined numbers of chickens.

FIGS. 27 and 28 illustrate a mobile packing machine in the form of a flat-bed lorry the load area of which carries batching apparatus 17 according to the invention. This hatching apparatus corresponds to the batching apparatus previously described except that in FIGS. 27 and 28 the loading units 28 do not shift vertically. The conveyor 12 does not therefore need to accommodate vertical movement of the loading units 28, but the downstream end of the conveyor swings about a vertical axis to deliver poultry to the loading units 28 in turn, as previously described. The lorry also carries a hopper 53 for receiving poultry from a catching vehicle 54 and a conveyor 12, including the counter described with reference to FIGS. 25 and 26. In FIGS. 27 and 28, the three loading units 28 do not shift vertically: instead the lorry supports a scissor lift which progressively lifts each module 18 to enable the drawers 19 in the module to be filled with poultry (by pulling each empty drawer out of the module and pushing each loaded drawer into the module as previously described), commencing with the upper level of drawers in the module and finishing with the lowest level of drawers in the module.

A module with empty drawers is delivered (arrows 82) to the infeed position adjacent the lorry cab. A conveyor chain 83 moves the module rearwardly (arrow 81) to a position above the scissor lift where, initially, the three loading units 28 are in horizontal register with the uppermost level of drawers 19 in the module. The drawers in this uppermost level are loaded with batches of poultry, as previously described. After this, the module is indexed upwardly, (arrow 85) to allow the drawers in the successive module levels to be loaded with poultry. When all the tiers or levels in the module are loaded with poultry, the module is further raised by the scissor lift to an offtake position 86, allowing the scissor lift to lower to its bottom position ready to accept the next module of empty containers 19. The loaded module is removed (arrows 87) from the offtake position, e.g. by a fork lift truck.

Reference is now made to FIGS. 29 to 33, which show a modified construction of batching apparatus suitable for use in loading with poultry a module having a stack of containers which, instead of being withdrawable from the module, are fixed in position but are provided with front opening flaps.

The modified apparatus comprises a batching receptacle 100 to which poultry is delivered in one of the ways heretofore described. Thus, reference 102 denotes the end of the loading conveyor, whereat a sensor 104 is provided for counting poultry as they are delivered into the batching receptacle. As before, the batching receptacle has an openable flap 106 at its output.

The cage-type module 108 comprising the stack of fixed containers 110 is delivered by a conveyor or other suitable means on to a lifting unit 112, so that the containers 110 can be elevated in steps past the output of the batching receptacle 100, whereby the containers can be filled with poultry in turn. The front openable flaps 114 of the containers can be opened and closed, in sequence, by a flap opening unit 116, which as illustrated is hydraulically operated, although other forms of drive could be employed instead.

Associated with and carried by the batching receptacle 110 is a delivery means 188. In practice, the batching receptacle includes a conveyor 120 for feeding poultry from the input to the output of the batching receptacle, whilst the delivery means comprises a delivery conveyor 118. This delivery conveyor 118 is extendable from beneath the batching receptacle to enter into a selected container when the front flap 114 of the container is open.

FIG. 29 shows the module 108 in process of being elevated. A hook 122 on the end of the piston of the flap opening unit 116 has engaged the top of the flap 114 of the uppermost container 110 and is ready to pull it open. Meanwhile, delivery of poultry into the batching receptacle is commencing, the output flap 106 of the receptacle being closed. The delivery conveyor 118 is retracted.

FIG. 30 shows the container flap 114 opened as the elevation of the module has progressed. This elevating movement has now ceased with the bottom of the uppermost container 110 just below the level of the delivery conveyor 118, which remains fully retracted. The piston of the flap opening unit has withdrawn. Delivery of the poultry into the batching receptacle 100 is continuing, but the output flap 106 remains closed.

In FIG. 31, poultry are continuing to be delivered and counted into the batching receptacle 100, with the output flap 106 still closed. However, the delivery conveyor 118 has been extended to cooperate with and enter the uppermost container 110.

Figure 32:
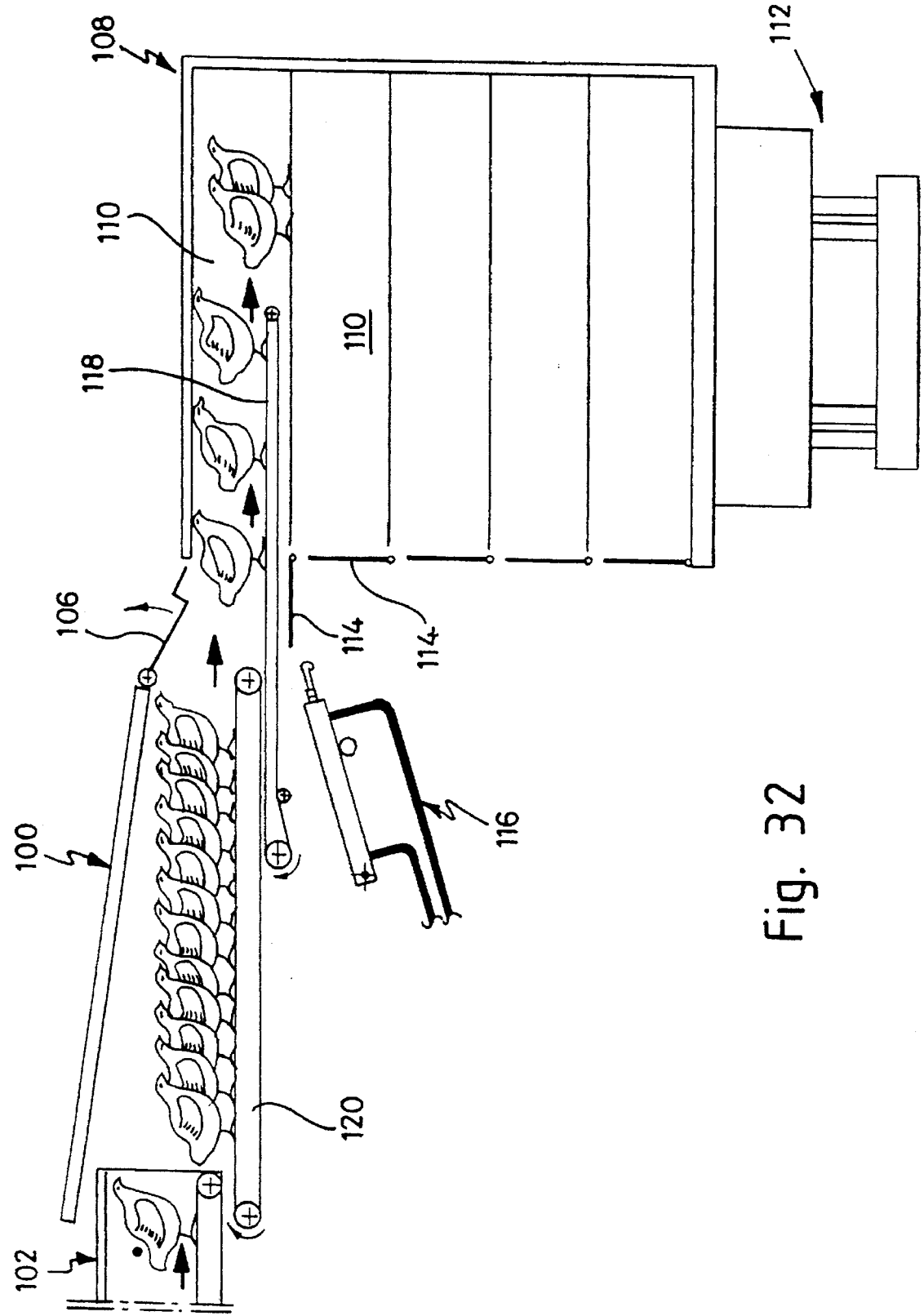

FIG. 32 shows the position after the batching receptacle 100 has been filled with a predetermined number of poultry counted by the sensor 104 and, optionally under the control of this sensor, loading of poultry into the receptacle has ceased and the output flap 106 of the hatching receptacle 100 has been opened, whereby poultry are being delivered from the receptacle conveyor 120 on to the delivery conveyor 118 and thence into the uppermost container 110. Optionally, as the container 110 is progressively filled, the delivery conveyor 118 may progressively retract.

Figure 33:
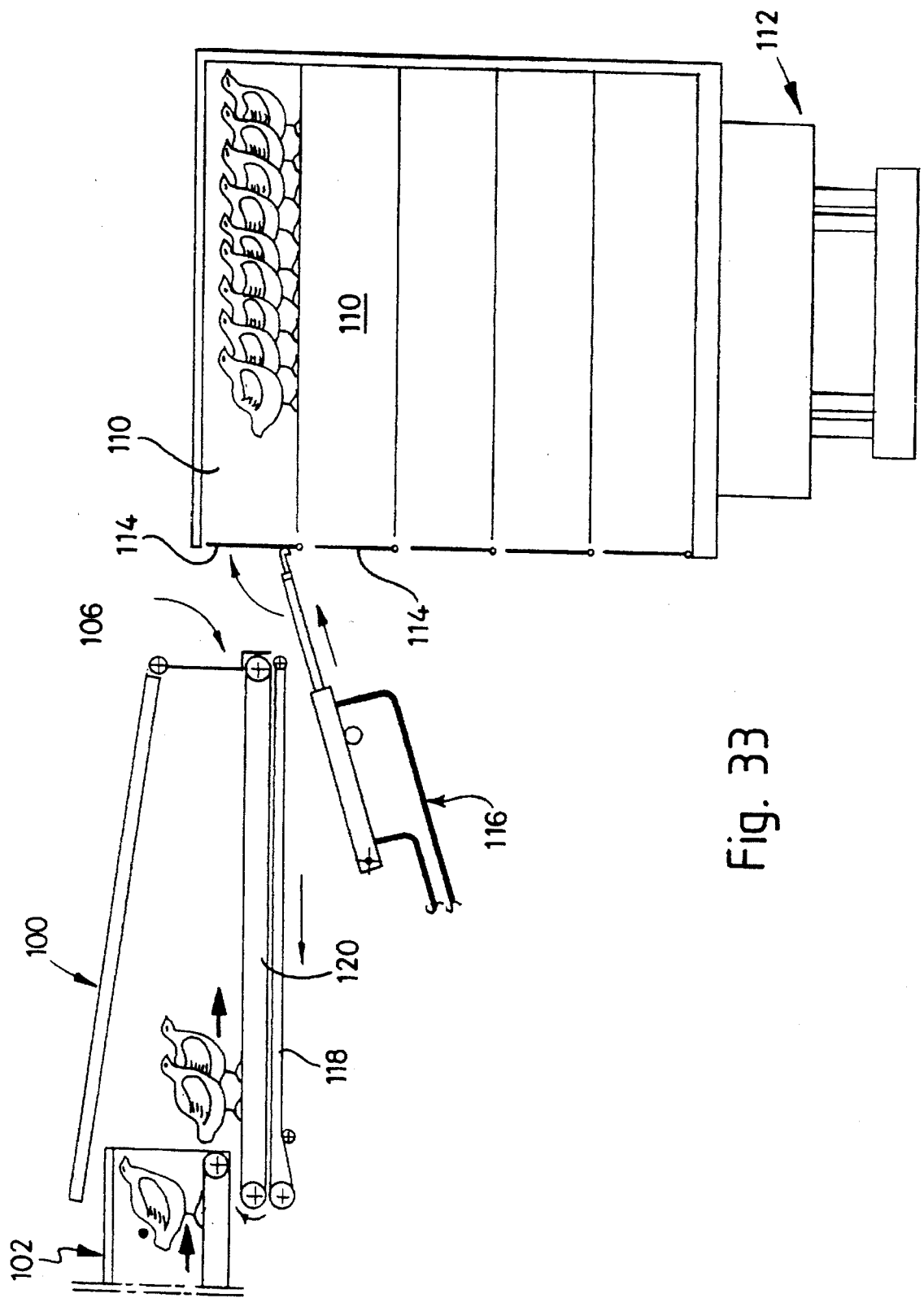

Finally, FIG. 33 shows the uppermost container 110 filled with a predetermined number of poultry, its front openable flap 114 now closed with a simple pushing action by the flap opening unit 116. The delivery container 118 is again fully retracted, and loading of poultry into the batching receptacle 100 is recommencing. The lifting unit 112 is now prepared to lift the module by an mount corresponding to the depth of one container, so that the next to uppermost container 110 of the module 108 will be filled with a predetermined number of poultry, in analogous manner to the above-described procedure by which the uppermost container has been filled.

In practice, the cage-type module 108 will usually comprise several side-by-side stacks of fixed containers 110 each with a front opening flap 114.

Thus, as heretofore described, a number of units each comprising a batching receptacle 100 and a delivery means 118 may be arranged side by side and operate in synchronism as the module 108 is elevated in steps. Additionally or alternatively, however, the hatching receptacle, with its associated delivery means, may be mounted for movement in a horizontal plane so as to deliver poultry to one stack after the other. Moreover, it is also possible to mount the batching receptacle and its associated delivery means for vertical movement, possibly to dispense with requirement for the lifting unit 112. The flap opening unit 116 can also be dispensed with if manual opening and closing of the from flaps 114 of the containers is acceptable. The poultry counting sensor 104 may be replaced by a weight sensor if preferred and as hereinbefore referred to.

What is claimed is:

1. Apparatus for loading poultry into containers, comprising a batching receptacle for receiving a batch of poultry corresponding to the capacity of a container, the batching receptacle having an input to receive the poultry and an output to discharge the poultry, the batching receptacle being operable to move the poultry from the input to the output, and shifting means for withdrawing a container from a module accommodating a plurality of such containers, moving the container into the apparatus for loading the container with a batch of poultry from the batching receptacle and for discharging the loaded container from the apparatus and returning the container to the module.

2. Apparatus according to claim 1 and in combination with the containers which are open-topped containers.

3. Apparatus according to claim 2, wherein the batching receptacle has in its base a conveyor which is operative to move the poultry from an input end to an output end thereof, at which a movable door or flap is provided, the door or flap being movable between a closed position in which it closes the output end and prevents the poultry leaving the batching receptacle and an open position in which poultry in the batching receptacle is allowed to pass into an open-topped container moved into the apparatus for loading thereof.

4. Apparatus according to claim 3, wherein the batching receptacle has sensing means which sense the weight of poultry in the batching receptacle and which, when a predetermined weight of poultry in the receptacle is reached, causes cessation of the delivery of poultry to the hatching receptacle and movement of the door or flap to the open position to allow unloading of the batch of poultry from the batching receptacle into the appropriate container.

5. Apparatus according to claim 3 and in combination with a counter for counting the number of birds delivered to the batching receptacle and causing cessation of delivery of poultry to the batching receptacle and movement of the door or flap to its open position when a predetermined number of birds has been received into the batching receptacle.

6. Apparatus according to claim 1, wherein the batching receptacle is vertically movable so as to be capable of alignment with a selected container in a column of containers accommodated in a module, a loading conveyor which delivers poultry to the batching receptacle being capable of moving in a vertical plane to accommodate this vertical movement of the batching receptacle.

7. Apparatus according to claim 6, wherein to increase poultry handling capacity and to enable the apparatus to function with a standard module accommodating an array or matrix of containers in a plurality of columns, the batching receptacle and the shifting means form one loading unit of a plurality of such units arranged side by side and in respective alignment with the columns of the containers in the module, operation of the apparatus being synchronized so that the loading conveyor is movable horizontally to load the batching receptacles in turn, each batching receptacle and the associated shifting means loading containers from successive levels of the appropriate column of containers in turn, such that the capacity of the apparatus to batch the poultry matches the delivery rate of poultry to the apparatus by the loading conveyor.

8. Apparatus according to claim 1, wherein the apparatus is in combination with means for vertically moving a module with respect to the batching receptacle the module containing a stack or tier of containers.

9. Apparatus according to claim 1, wherein the shifting means comprise a hook which is horizontally movable to pull an empty container into the apparatus for loading and to push a loaded container out of the apparatus.

10. Apparatus according to claim 9, wherein the hook is shaped so as automatically to engage a container when the hook is advanced towards an empty container, the hook being capable of being lifted to cause displacement of the hook from the loaded container.

11. Apparatus according to claim 1, wherein the apparatus is rendered mobile by being mounted on wheels and being in combination with traction means, the combination constituting a mobile poultry packing machine.

12. A mobile poultry packing machine according to claim 11, wherein the machine has a receiving location to receive poultry, conveyors being provided to convey the poultry from the receiving location to the series of batching receptacles.

13. A mobile poultry packing machine according to claim 12, wherein the receiving location is constituted by a catching unit, mounted on the front end of an arm which swings from side to side to gather poultry from a poultry house.

14. A mobile poultry packing machine according to claim 11, and in combination with a separate catching vehicle capable of moving independently of the apparatus, to catch live poultry, and bring the poultry to a receiving location from where the poultry are conveyed to the series of hatching receptacles.

15. A mobile poultry packing machine according to claim 14, wherein the catching vehicle is sufficiently compact and maneuverable to enable it to reach virtually all parts of the floor area of a typical poultry house, being able to pass into aisles defined by internal posts or stanchions in the house and being able to pass between such posts or stanchions.

16. A mobile poultry packing machine according to claim 15, wherein the catching vehicle has a pair of conveyor arrangements on respective sides of the catching vehicle, the front end of each conveyor arrangement being equipped with a poultry catching head and the rear end being equipped with a flap controllably movable between a closed position closing the rear end of the corresponding conveyor arrangement and an open position in which poultry can be delivered from the rear end of the conveyor arrangement to the receiving location on the packing machine.

17. A mobile poultry packing machine according to claim 16, wherein each conveyor arrangement is itself liftable between a lowered poultry-gathering position and a raised poultry-discharging position, with each conveyor arrangement including a foremost elevating conveyor, extending upwardly and rearwardly towards an accumulating conveyor at the rear of which is located the controllably movable flap.

18. A mobile poultry packing machine according to claim 11, wherein the machine includes a receiving hopper at the receiving location of the packing machine, a transport conveyor for conveying poultry away from the hopper and loading means for progressively loading poultry within the hopper into the transport conveyor, so that a substantially uniform flow rate of poultry from the hopper is achieved.

19. A mobile poultry packing machine according to claim 18, wherein the loading means comprise two base panels positioned on respective sides of the transport conveyor, the base panels being pivotable about substantially horizontal axes to respective raised positions in which each base panel is inclined downwardly towards the transport conveyor so that progressive pivotal movement of the two base panels from lowered positions thereof causes progressive delivery of poultry within the hopper onto the transport conveyor.

20. A method of loading poultry into containers, comprising delivering the poultry to a batching receptacle until the receptacle contains a quantity of poultry corresponding to the capacity of a container, at which time the supply to the receptacle is interrupted and the batch of poultry in the receptacle is delivered to a container occupying a loading position beneath the receptacle, to which position the container has been moved from a module accommodating a plurality of such containers, and moving the container, now loaded with the batch of poultry, out of the apparatus and back into the module, and correspondingly loading remaining containers in the module until all the containers in the module are loaded with poultry.

21. A mobile poultry packing machine comprising a wheeled vehicle carrying means for supporting a module containing a plurality of containers, a plurality of loading units each including a batching receptacle and shifting means operative to withdraw a container out of the module and into a position in which the container can be loaded with a batch of poultry and then to return a loaded container to the module, means for effecting relative vertical movement between the module and the loading units to enable containers at different levels in the module to be loaded, and counting means for loading each hatching receptacle with a predetermined number of chickens corresponding to the desired number of chickens in each container.

22. A mobile poultry packing machine according to claim 21 and in combination with a separate catching vehicle for catching chickens and delivering them to a receiving location on the mobile packing machine.

23. A combination according to claim 22, wherein the mobile packing machine has a conveyor which delivers poultry from the receiving location to the loading units, the conveyor being fitted with said counting means which counts the number of chickens passing along the conveyor.

24. A combination according to claim 23, wherein the conveyor has dividing panel means which divides the width of the conveyor into a plurality of channels down each of which the chickens are constrained to pass in single file, to facilitate accurate counting by the counting means.

* * * * *